(12) United States Patent
Li et al.

(10) Patent No.: US 9,390,129 B2
(45) Date of Patent: Jul. 12, 2016

(54) SCALABLE AND ADAPTIVE EVALUATION OF REPORTING WINDOW FUNCTIONS

(71) Applicant: Oracle International Corporation, Redwood Shores, CA (US)

(72) Inventors: Huagang Li, San Jose, CA (US); Srikanth Bellamkonda, Mountain View, CA (US); Sankar Subramanian, Cupertino, CA (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 273 days.

(21) Appl. No.: 13/754,687

(22) Filed: Jan. 30, 2013

(65) Prior Publication Data

US 2014/0214754 A1 Jul. 31, 2014

(51) Int. Cl.
*G06F 7/00* (2006.01)
*G06F 17/30* (2006.01)

(52) U.S. Cl.
CPC .... *G06F 17/30433* (2013.01); *G06F 17/30442* (2013.01); *G06F 17/30471* (2013.01)

(58) Field of Classification Search
CPC .............. G06F 17/30471; G06F 17/30486; G06F 17/30442; G06F 17/30463
USPC .......................... 707/602, 718, 769
See application file for complete search history.

(56) References Cited

U.S. PATENT DOCUMENTS

| | | | |
|---|---|---|---|
| 5,499,368 A | 3/1996 | Tate et al. | |
| 6,389,410 B1 * | 5/2002 | Gupta | |
| 6,622,138 B1 * | 9/2003 | Bellamkonda et al. | |
| 6,978,458 B1 * | 12/2005 | Ghosh et al. | 718/100 |
| 2005/0187958 A1 | 8/2005 | Wong | |
| 2006/0190947 A1 * | 8/2006 | Ghosh et al. | 719/313 |
| 2009/0063527 A1 * | 3/2009 | Corvinelli et al. | 707/101 |
| 2014/0214799 A1 * | 7/2014 | Li et al. | 707/718 |

OTHER PUBLICATIONS

Bellamkonda et al., Enhanced Subquery Optimizations in Oracle, VLDB '09, Aug. 24-28, 2009, Lyon France, pp. 1366-1377.*
Bellamkonda et al., Adaptive and Big Data Scale Parallel Execution in Oracle, The 39th International Conference on Very Large Data Bases, Aug. 26-30, 2013, Riva del Garda, Trento, Italy, pp. 1102-1113.*
U.S. Appl. No. 13/754,740, filed Jan. 30, 2013, Office Action.

* cited by examiner

*Primary Examiner* — Cheyne D Ly
(74) *Attorney, Agent, or Firm* — Hickman Palermo Becker Bingham LLP; Marcel K. Bingham

(57) ABSTRACT

According to one aspect of the invention, for a database statement that specifies evaluating reporting window functions, a computation-pushdown execution strategy may be used for the database statement. The computation-pushdown execution plan includes producer operators and consolidation operators. Each producer operator computes a respective partial aggregation for each reporting window function based on a subset of rows, and broadcasts the respective partial aggregation. Each consolidation operator fully aggregates all partial aggregations broadcasted from the producer operators. Alternatively, an extended-data-distribution-key execution plan may be used. Each producer operator sends rows based on hash keys to sort operators for computing partial aggregations for at least one reporting window function based on a subset of rows. Each consolidation operator receives and fully aggregates all partial aggregations broadcasted from the sort operators.

20 Claims, 7 Drawing Sheets

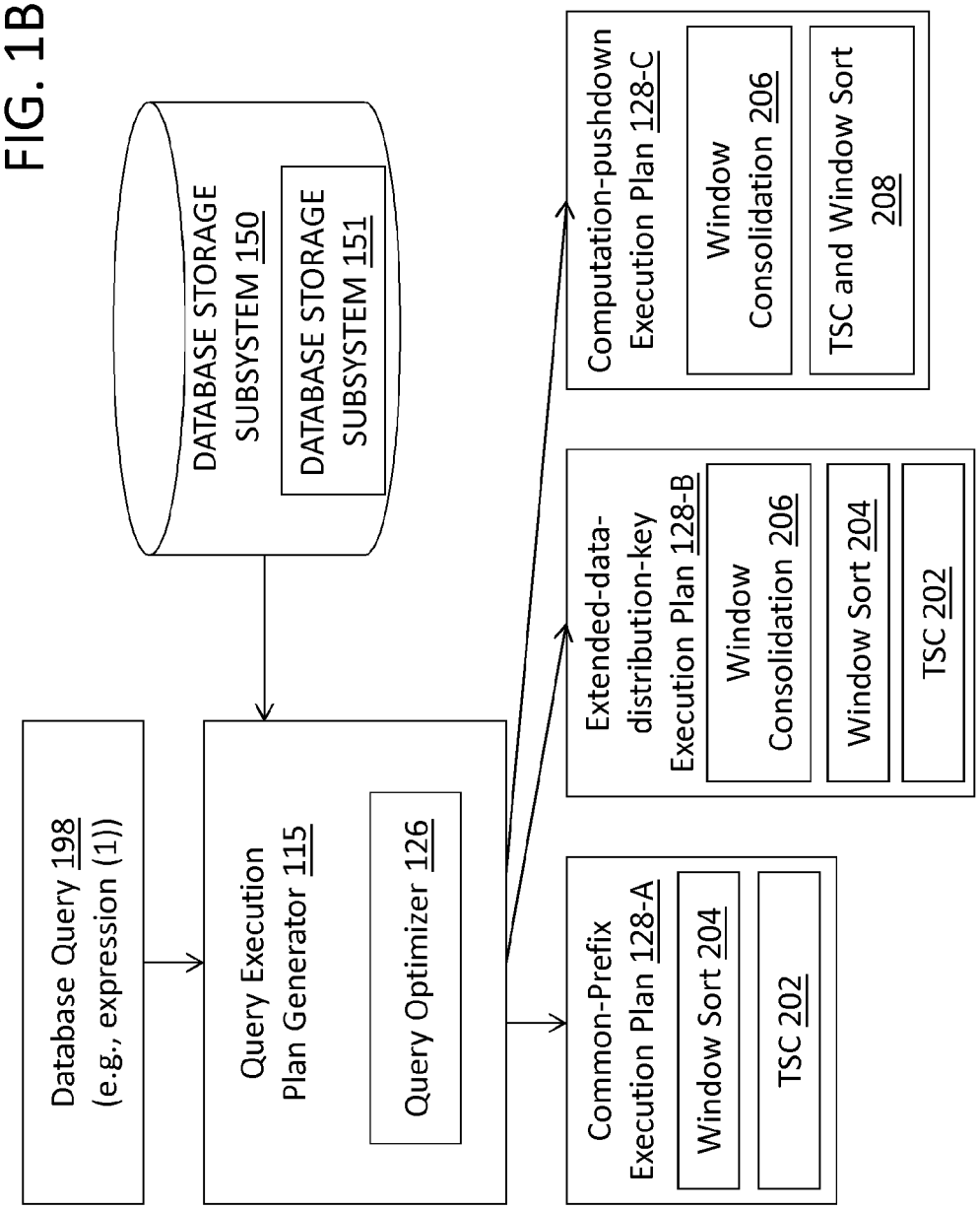

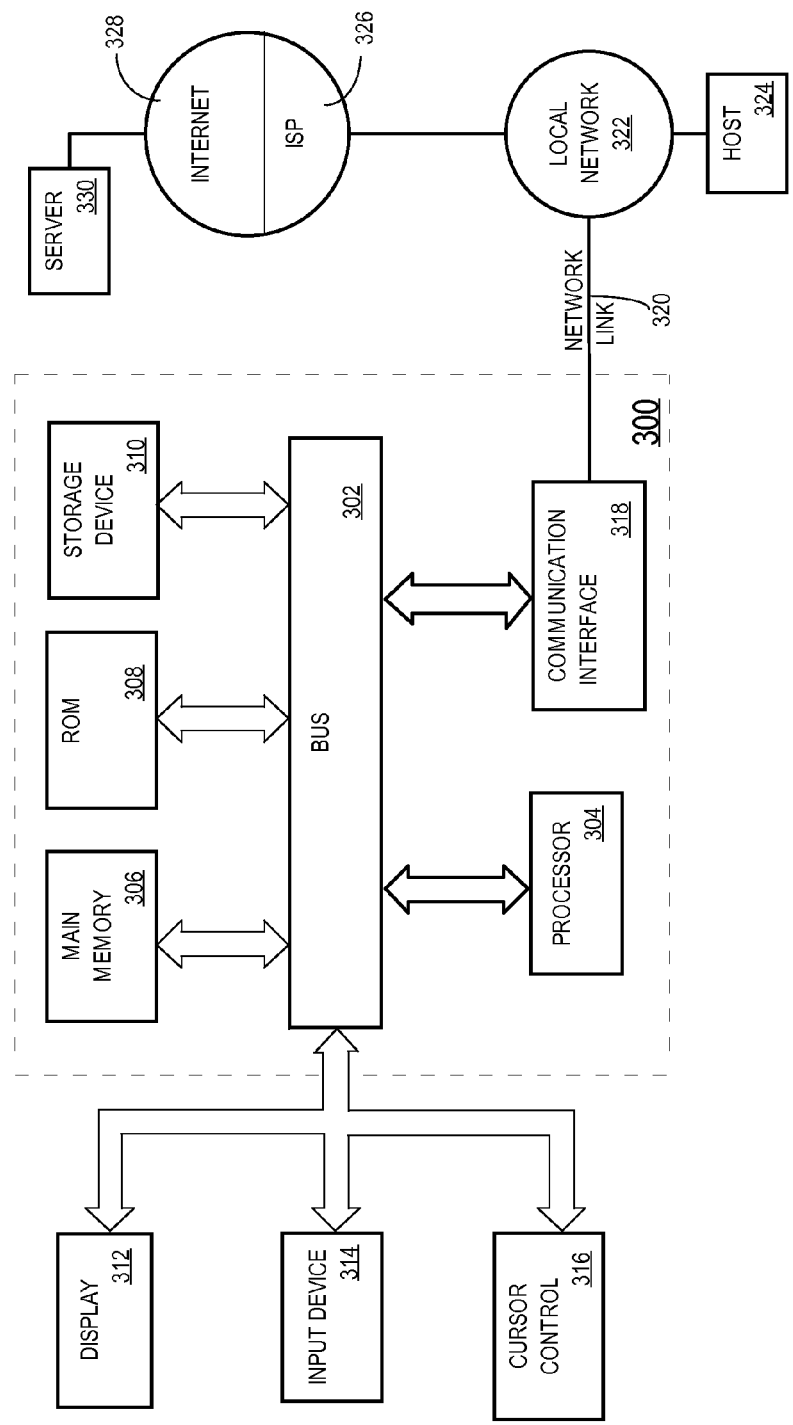

SCALABLE AND ADAPTIVE EVALUATION OF REPORTING WINDOW FUNCTIONS

TECHNICAL FIELD

The present invention relates to relational database management systems and, more specifically, to techniques for evaluating reporting window functions in a relational database management system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Window functions have been very popular in the user community and become an integral part of data warehouse queries. A class of window functions commonly used in data warehousing is reporting window functions. Database statements in data warehouse environments may involve multiple such reporting window functions at successive hierarchical levels.

Window functions such as reporting window functions are often used as foundational analysis tools for data sets. For example, one or more such window functions may be used to extract information on sales data stored in a database system. This information can be utilized by a company to track sales, evaluate policy, develop marketing strategy, project future growth, and perform various other tasks.

Records from one or more database tables can be grouped according to one or more partition-by keys. Reporting window functions can be calculated based on records in each group. The desired grouping can be specified in a database query, such as a SQL query.

Given the importance of window functions for data analysis, providing a quick result for database queries containing window functions is often an important database performance metric. To answer such a database query in an accelerated fashion, the database query can be formulated as parallel operations when creating a query execution plan for execution by database software in a hardware configuration.

Based on the foregoing, there is a need for developing techniques that can evaluate window functions in a highly efficient and scalable fashion.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B is a block diagram that depicts the generation of exemplary query execution plans using a query optimizer;

FIG. 3 is a block diagram illustrating a computer system on which embodiments of the invention may be implemented.

DETAILED DESCRIPTION

Figure 1A:
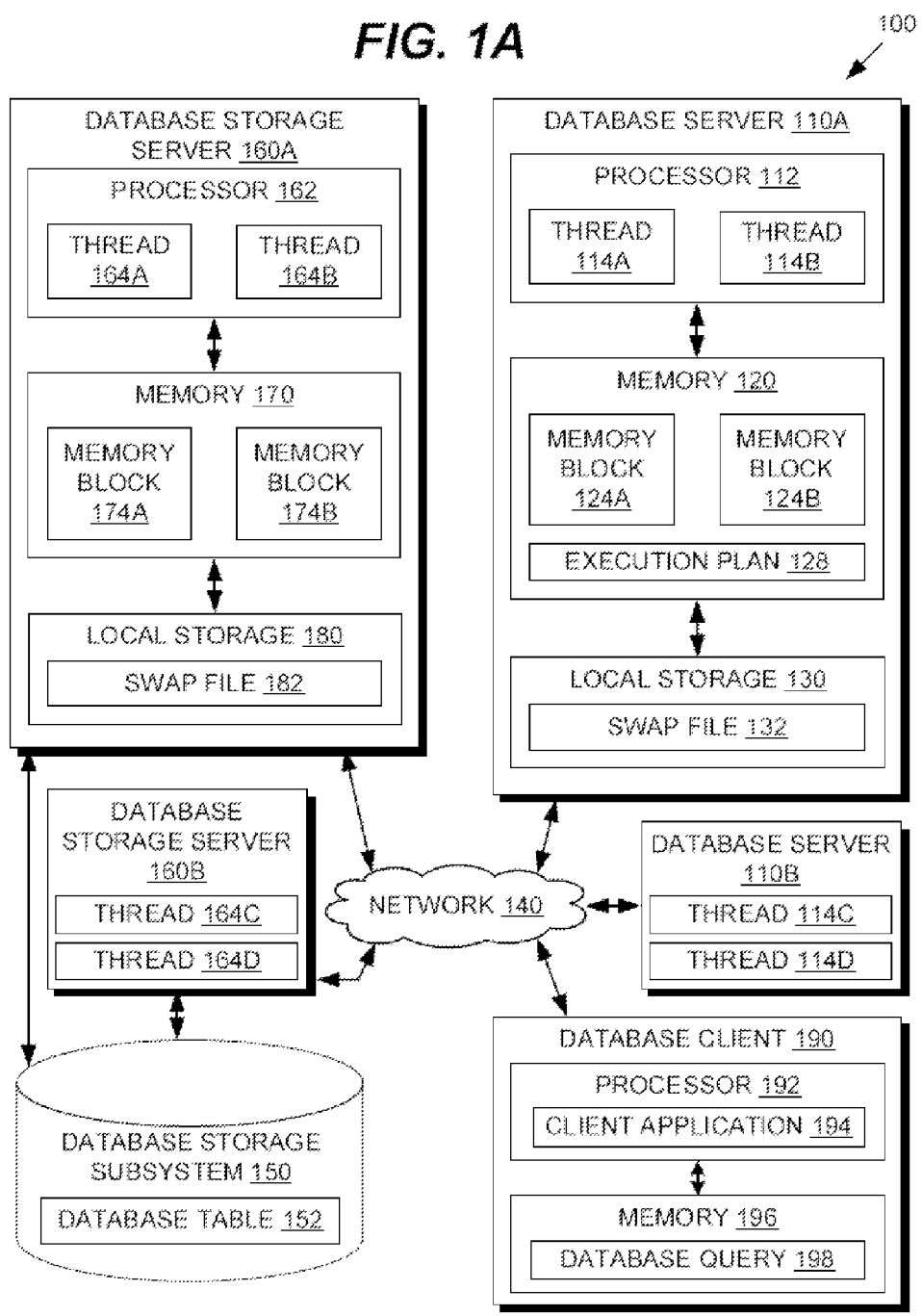
FIG. 1A is a block diagram that depicts an exemplary database system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Definitions

A "computing node", as the term is used herein, refers to a set of one or more processes (under control of an operating system) and a portion of memory and/or other computer resources, that are allocated for performance of one or more functionalities pursuant execution of software by said one or more processes. A computing node is also referred to herein as a node. A node includes a "server" or "server instance" that is configured to respond to requests from various clients and applications for one or more services and/or functionalities.

Examples of nodes include without limitation database servers that manage data in one or more databases, storage devices that store data persistently for database servers, multimedia server instances that manage various types of multimedia such as images, audio/video streams, and other streamed multimedia content, internet server instances that cache content that is persistently stored elsewhere, application server instances and other types of middleware server instances that cache data to service particular types of clients and applications, and any other types of instances that are configured to process persistently stored data by buffering it into a volatile memory cache.

An "execution plan" or "query execution plan", as the term is used herein, refers to a set of steps that are generated by a database system to execute a database query. Several candidate execution plans may be generated for a particular query, and a candidate execution plan estimated to be most efficient may be selected as the actual execution plan. The selection of an optimal candidate execution plan is beyond the scope of the present application and the selection of an efficient candidate execution plan will be assumed.

An execution plans may be represented by a tree (or a graph) of interlinked nodes, referred to herein as "operators", each of which corresponds to a step of the execution plan, referred to herein as an execution plan operation. The hierarchy of the tree represents the order in which the execution plan operations are performed and how data flows between each of the execution plan operations. Execution plan operations include, for example, an aggregation, a sort, a table scan, an index scan, hash-join, sort-merge join, nested-loop join, and filter.

A "record source", as the term is used herein, refers to an operator that produces a set of records when executed, for example by scanning the rows of a database table, or by performing an operation, such as a table join, on one or more inputs to create a new set of intermediate records. When a record source is defined for a particular operator, such as for an aggregation operator, a sort operator, etc., then the record source is defined as an input for that particular operator.

When data is stored in a relational database system, applications access the data by submitting commands that conform to the database language supported by the relational database system, the most common of which is the Structured Query Language (SQL).

Relational database systems store data in the form of related tables, where each table has one or more columns and zero or more rows. A relational database management system may organize data in the tables in disk blocks on disk. A "disk block" is a logical unit of data storage used by a relational database management system for storing database data. A disk block has a block size (e.g., 4 KB) and may encompass one or more underlying file system or operating system blocks. Among other information, a disk block may include the data of one or more rows of a table or tables, or the data of a row may span multiple disk blocks.

General Overview

Techniques are provided that address the problems associated with prior approaches for evaluating reporting window functions in a relational database management system. These techniques overcome the limitations of traditional/simple parallelization models that fail to fully leverage the processing power of a relational database management system. Parallelization models for evaluating reporting window functions as described herein include multiple stages each of which may adapt its computation based on data characteristics, thereby providing high scalability and efficient execution. A database system that implements techniques as described herein provides better scalability of reporting window function computation, in keeping with the fast growing pace of modern hardware and massively scalable systems.

Existing parallel execution schemes for evaluating reporting window functions do not scale well. These schemes do not fully leverage system's parallel processing resources. For example, each reporting window function may be evaluated based on an individual data distribution comprising partition-by keys (or columns) of that reporting window function. This approach generates significant computation overheads such as sorting and significant data traffic between parallel executing processes, when there are multiple reporting window functions to be evaluated. Furthermore, some of the multiple window functions may not have sufficient numbers of distinct values for distributing data to available parallel executing processes. Accordingly, the number of parallel executing processes that can receive their respective data is low. Alternatively, a data distribution key may be selected based on a common prefix among multiple sequences of partition-by keys respectively specified for the reporting window functions. This approach may avoid computation overheads and data traffic problems in other approaches. However, when the number of distinct values of the common prefix is low, the number of parallel executing processes that can receive their respective data is also low.

Scalable computation algorithms under techniques as described herein may be used to overcome this scalability issue. In a first phase of the algorithms, input rows are distributed using an extended data-distribution key or a computation-pushdown strategy, instead of using a common prefix among sequences of partition-by keys respectively specified for the reporting window functions. This data distribution strategy is effective in that it can scale up to many parallel processing entities such as parallel executing processes without being limited to the number of distinct value of the common prefix. Aggregations, some or all of which may be partial, of data values in the reporting window functions may be performed in the first phase in parallel by a set of processes. As used herein, the term "process" may refer to any processing entity including an operating process, a thread, a light weight process, a database server, an operator that performs one or more database related operations, etc.

In a second phase of the algorithms, partial aggregations among the aggregations performed in the first phase are broadcasted to a second set of parallel executing processes. These partial aggregations are then consolidated into full aggregations for all reporting window functions that are only partially aggregated in the first phase.

At runtime, the actual numbers of distinct values of all combinations of partition-by keys specified for the reporting window functions may be monitored by producer operators. Each producer notifies a query coordinator that a specific combination of partition-by keys or none of the combinations has a sufficient number of distinct values as well as the smallest number of columns.

The query coordinator collects all the notifications from all the producers and selects a global combination among specific combinations respectively received from the producer based on one or more selection factors. The query coordinator notifies parallel processing entities which execution strategy is to be used. If a common prefix execution strategy or an extended key execution strategy is selected, the query coordinator also notifies the parallel processing entities of the global combination of partition-by keys as a new data distribution key for data distribution. Accordingly, the parallel processing entities collectively and adaptively switch to the selected execution strategy, which may be different from the one in the execution plan generated before runtime.

System Overview

FIG. 1A is a block diagram that depicts an exemplary database system, according to an embodiment. Database system 100 of FIG. 1A includes database server 110A, database server 110B, network 140, database storage subsystem 150, database storage server 160A, database storage server 160B, and database client 190. Database server 110A includes processor 112, memory 120, and local storage 130. Processor 112 includes threads 114A and 114B. Memory 120 includes memory block 124A, memory block 124B, and execution plan 128. Local storage 130 includes swap file 132. Database server 110B includes thread 114C and thread 114D. Database storage subsystem 150 includes database table 152. Database storage server 160A includes processor 162, memory 170, and local storage 180. Processor 162 includes thread 164A and thread 164B. Memory 170 includes memory block 174A and memory block 174B. Local storage 180 includes swap file 182. Database storage server 160B includes thread 164C and thread 164D.

Database servers 110A-110B and database storage servers 160A-160B are multi-node systems, each comprising any multiple number of nodes. Threads 114A-114B may be referred to as consumers, whereas threads 164A-164B may be referred to as producers. Multiple threads or processes may be assigned to the same operator, which may also execute in parallel on multiple computing devices. Embodiments of the present invention are illustrated using multi-node systems; however an embodiment of the present invention is not so limited.

While only a single database client 190 is shown, embodiments of database system 100 may support multiple database clients concurrently. Additionally, while only a single database table 152 is shown in database storage subsystem 150, embodiments may also include multiple database tables, and database query 198 may address multiple database tables in a single query. Embodiments of database system 100 may also include any desired quantity of database servers, database storage servers, and database storage subsystems. For simplicity, database server 110B and database storage server 160B are shown in abbreviated form in FIG. 1A. However, database server 110B may contain elements similar to those shown in database server 110A, and database storage server 160B may contain elements similar to those shown in database storage server 160A.

Client application 194 executing on processor 192 of database client 190 may be directed towards various database applications including web services, data transactions, data mining, high-performance computing (HPC), and other applications. A database query 198 may be generated at client application 194 as a SQL query for execution on database table 152, and the query may be routed to an available database server, such as database server 110A. In response, database server 110A may generate a corresponding execution plan 128, which may be executed in parallel over available threads on database storage servers 160A-160B and database servers 110A-110B. As shown in database system 110, each thread 114A, 114B, 164A, and 164B may allocate a corresponding memory block 124A, 124B, 174A, and 174B, respectively. If insufficient memory is available, then virtual memory may be utilized via swap files 132 and 182 of local storage 130 and 180, respectively. However, as discussed below, execution plan 128 may be structured to avoid swapping to local storage.

Reporting Window Functions

Reporting window functions are a class of window functions that can be specified in any of a plurality of forms including but not limited to the following example forms:

---
FUNCTION_NAME(<expr1> [, <expr2> ...]) OVER (PARTITION
    BY <expr3> [, <expr4>, ...])
....
FUNCTION_NAME((<expr1> [, <expr2> ...]) OVER (PARTITION
    BY <expr3> [, <expr4>, ...] [ORDER BY <expr5>, ...
    ROWS|RANGE BETWEEN UNBOUNDED PRECEDING AND
    UNBOUNDED FOLLOWING])
---

The first example form of reporting window function above may be considered as a reduced form of other forms of reporting window functions. A reporting function is specified with a sequence of one or more partition-by keys. Specifically, each of one or more expressions such as <expr3>, <expr4>, etc., in the partition-by clause of a reporting window function as shown above represents a partition-by key. The sequence of one or more partition-by keys is represented by a list comprising the one or more expressions such as <expr3>, <expr4>, etc., in the order as specified in the partition-by clause. Examples of functions denoted as FUNC-TION_NAME in the above expressions include but are not limited to sum, min, max, count, average, etc. Such a function may be evaluated over a measure column (e.g., a "sale_amount" column in a "sales" table), which may be specified as one of the expressions inside the function.

Database statements may specify multiple reporting window functions at successive hierarchical levels. For example, a single database statement can have multiple reporting window functions (a) "sum(sale) over (partition by year, quarter, month)", (b) "sum(sale) over (partition by year, quarter)", and (c) "sum(sale) over (partition by year)", as shown in the following expression:

SELECT year, quarter, month, sale,

SUM (sale) OVER (PARTITION BY year, quarter,
    month) monthly-sales,

SUM (sale) OVER (PARTITION BY year, quarter)
    quarterly-sales,

SUM (sale) OVER (PARTITION BY year) yearly-
    sales

FROM sales;    (1)

These reporting window functions may be alternatively referred to as "monthly-sales", "quarterly-sales", and "yearly-sales", respectively, as their aliases indicate.

For the purpose of illustration, when the database statement is evaluated against a set of (input) rows, a result row is returned for each (input) row in the set of rows, as shown in the following table:

| Year | quarter | Month | Sale | monthly-sales | quarterly-sales | yearly-sales |
|------|---------|-------|------|---------------|-----------------|--------------|
| Y1 | Q1 | M1  | 3 | 3 | 6  | 42 |
| Y1 | Q1 | M2  | 2 | 2 | 6  | 42 |
| Y1 | Q1 | M3  | 1 | 1 | 6  | 42 |
| Y1 | Q2 | M4  | 2 | 2 | 9  | 42 |
| Y1 | Q2 | M5  | 3 | 3 | 9  | 42 |
| Y1 | Q2 | M6  | 4 | 4 | 9  | 42 |
| Y1 | Q3 | M7  | 3 | 3 | 12 | 42 |
| Y1 | Q3 | M8  | 4 | 4 | 12 | 42 |
| Y1 | Q3 | M9  | 5 | 5 | 12 | 42 |
| Y1 | Q4 | M10 | 6 | 6 | 15 | 42 |
| Y1 | Q4 | M11 | 5 | 5 | 15 | 42 |
| Y1 | Q4 | M12 | 4 | 4 | 15 | 42 |
| Y2 | Q1 | M1  | 3 | 3 | 10 | 58 |
| Y2 | Q1 | M2  | 2 | 2 | 10 | 58 |
| Y2 | Q1 | M3  | 5 | 5 | 10 | 58 |
| Y2 | Q2 | M4  | 6 | 6 | 13 | 58 |
| Y2 | Q2 | M5  | 3 | 3 | 13 | 58 |
| Y2 | Q2 | M6  | 4 | 4 | 13 | 58 |
| Y2 | Q3 | M7  | 7 | 7 | 16 | 58 |
| Y2 | Q3 | M8  | 4 | 4 | 16 | 58 |
| Y2 | Q3 | M9  | 5 | 5 | 16 | 58 |
| Y2 | Q4 | M10 | 6 | 6 | 19 | 58 |
| Y2 | Q4 | M11 | 5 | 5 | 19 | 58 |
| Y2 | Q4 | M12 | 8 | 8 | 19 | 58 |

As can be seen above, each result row may comprise return database values (the first four columns) of columns of the input row. In addition, for each input row (or database record) that comprises specific partition-by key values to indicate a specific year, a specific quarter and a specific month, a corresponding result row also returns (a) a first aggregated "sale" value for all rows having the partition-by key values of the specific year, the specific quarter and the specific month, as "monthly-sales"; (b) a second aggregated "sale" value for all rows having the partition-by key values of the specific year and the specific quarter, as "quarterly-sales"; and (c) a third aggregated "sale" value for all rows having the partition-by key value for the specific year, as "yearly-sales", as requested by the database statement. The example rows in TABLE 1 comprise duplicate rows of the same combination of values of partition-by columns of the "yearly-sales" and "quarterly-sales" reporting window functions but do not comprise duplicate rows of the same combination of values of partition-by columns of the "monthly-sales" reporting window function. This is for illustration purposes only. Other types of input data can be processed with techniques as described herein, including input data that comprise duplicate rows for all reporting window functions.

Shared Sort Order

To evaluate reporting window functions, a set of rows may be arranged in one of many different ways including but not limited to sorting, hashing, etc. In some embodiments, the set of rows may be optionally arranged in a sort order shared by the reporting window functions. Such a sort order may be referred to herein as a "shared sort order." Using a shared sort order for evaluating multiple reporting window functions avoids or reduces expensive sort operations that otherwise may be needed to perform for each of the (multiple) reporting window functions. This is especially advantageous when the set of rows is numerous, as sorting can be expensive in terms of resource usage and response time.

As illustrated in TABLE 1, a set of result rows with respective aggregated values of the reporting window functions may be returned in the same shared sort order (e.g., a sort order of year, quarter, and month) used to internally arrange the set of (input) rows in database operations to generate the set of result rows.

A specific sequence of partition-by keys (e.g., year, quarter, and month) for a specific reporting window function (e.g., "monthly-sales") among the reporting window functions may be selected or determined as a shared sort order. For example, it may be determined that since the "quarterly-sales" and "yearly-sales" reporting window functions are less specific than the "monthly-sales" reporting window function, the former reporting window functions are able to share or use the same sort order of the set of rows for evaluating the latter reporting window function. Therefore, the set of (input) rows from a table "sales" may be arranged in the shared sort order based on the sequence of partition-by keys "year", "quarter" and "month" for the "monthly-sales" reporting window function, as illustrated in TABLE 1.

Common Prefix

A common prefix refers to a subsequence (or a subset of sequence) of partition-by keys shared by all reporting window functions in a set of reporting window functions specified in a database statement. In some embodiments, a common prefix may be a subsequence of partition-by keys maximally shared among all the reporting window functions in the set of reporting window functions. In some other embodiments, a common prefix may a subsequence of partition-by keys either maximally or non-maximally shared among all the reporting window functions in the set of reporting window functions. In the example database statement as shown in expression (1), the common prefix among the three reporting window functions is the "year" column of the table "sales", which is a partition-by key (or a subsequence of one or more partition-by keys) shared by all three reporting window functions.

When a database statement such as expression (1) is executed in parallel in runtime, data distribution to a plurality of operators/processes can be done based on distinct values of a common prefix. A distinct value of a sequence/subsequence of partition-by keys—e.g., a common prefix among sequences of partition-by keys respectively specified for reporting window functions, a sequence/subsequence of partition-by keys for a particular window function, etc. —refers to a unique combination of partition-by key values in the sequence/subsequence of partition-by keys. For example, a distinct value of a common prefix refers to a unique combination of partition-by key values in the common prefix.

Figure 2A:
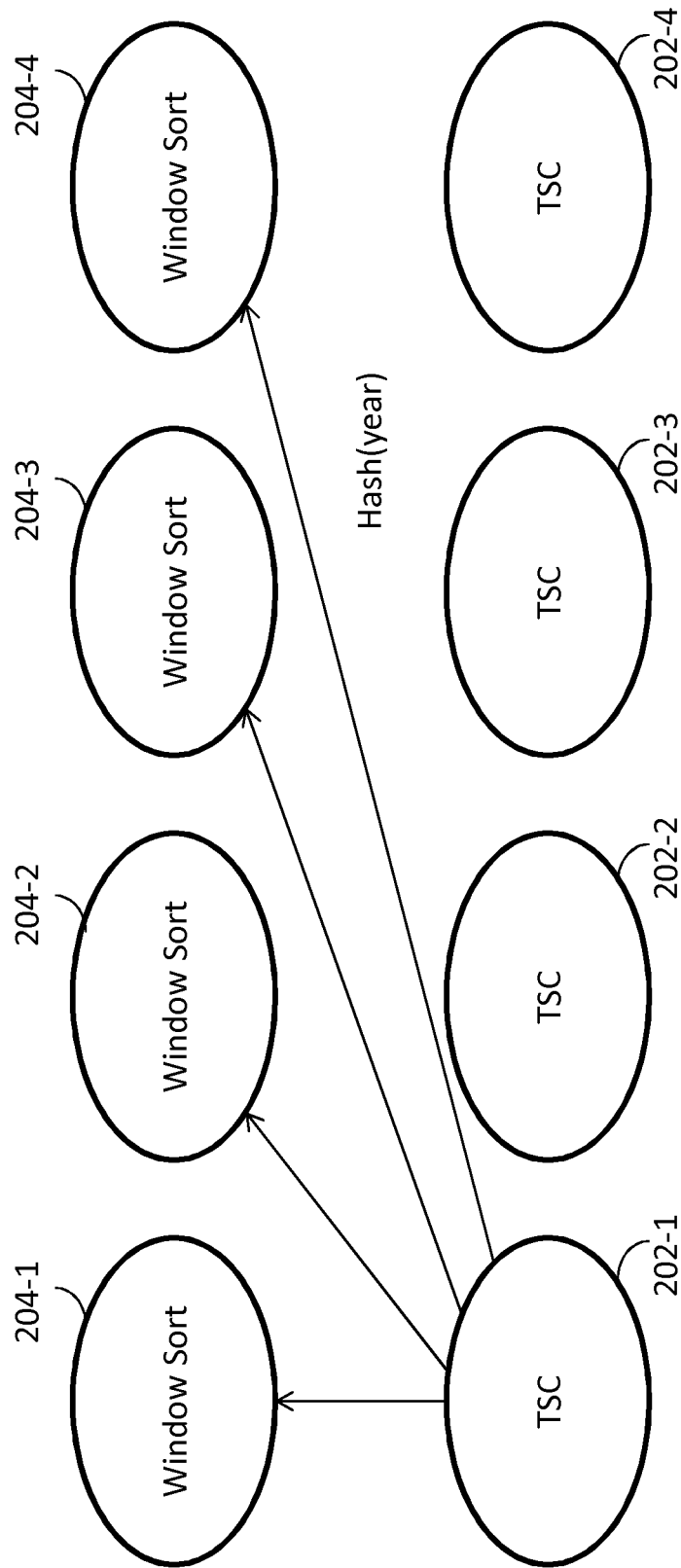
FIG. 2A, FIG. 2B and FIG. 2C illustrate example execution plans.

A common-prefix execution plan refers to a parallel execution plan for a database statement that uses a common prefix for data distribution to multiple parallel executing processes performing underlying database operations. FIG. 2A illustrates an example common-prefix execution plan to execute a database statement comprising reporting window functions as illustrated in expression (1). The common-prefix execution plan comprises a plurality of table scan (TSC) operators and a plurality of window sort operators. Each of these operators in the common-prefix execution plan may be assigned to a respective process for execution in runtime. It should be noted that a TSC is used as an example of a producer operator. One or more producer operators other than TSC operators may be used for the purpose of the invention.

Each window sort operator may consume or receive (input) rows with one or more specific distinct values of a common prefix among the reporting window functions and assigned to evaluate reporting window functions using the rows having these specific distinct values of the common prefix.

Each TSC operator may be assigned the task to retrieve (input) rows or records from a size-comparable portion of data blocks in a database table and distribute the retrieved rows to respective window sort operators based on distinct values of the common prefix as indicated in database values of the retrieved rows. A TSC operator may use a distribution function (e.g., a hash function, a range distribution function, etc.) that takes a distinct value of the common prefix indicated by database values of an input row as input and returns the identity of a corresponding window sort operator to which the input row should be sent or distributed.

Window sort operators/processes receiving their respective subsets of rows may sort or arrange the received rows into a shared sort order as mentioned above. Evaluation (e.g., aggregation, averaging, etc.) of all the reporting window functions in the set of reporting window functions may be performed against (e.g., sequentially through) the same shared sort order. Since all rows in a particular subset of rows received by a particular window sort operator/process share the same unique combination of key values of the common prefix, the particular window sort operator/process can compute the reporting window functions based on the subset of rows, independent of other window sort operators/processes. The other window sort operators/processes can concurrently and independently compute the reporting window functions based on other subsets of rows that do not share the same combination of key values of the common prefix as the particular subset of rows.

In the present example, data distribution made to a plurality of window sort operators/processes (e.g., 204-1 through 204-4 of FIG. 2A) may be based on the "year" column (which is the only partition-by key in the common prefix in this example). A window sort operator/process that receives a subset of rows that share the same key value (e.g., "Y1") of the "year" column can proceed to compute each of the reporting window functions (for year "Y1") independent of other window sort operators/processes that receive other subsets of rows (for other years "Y2", "Y3", etc.) that do not share the same key value ("Y1") of the "year" column.

One or more operators—for example, window sort operators (204-1 through 204-4 of FIG. 2A) —may return the input rows with fully aggregated values for all reporting window functions in the set of reporting window functions as a result set (e.g., TABLE 1) of the database statement.

This parallel execution model works well when the number of partitions, or the number of subsets of rows created by distinct values of a common prefix, is sufficiently large to satisfy one or more criteria relating to a desired degree of parallelism (DOP).

A DOP refers to a type of parallel processing measure that indicates how many parallel processing entities/units such as parallel executing processes should be (approximately) used for parallel execution of a database statement. For example, a DOP value of ten may indicate that ten parallel executing processes may be available for performing one or more operations in parallel. A user may annotate different tables with the same or different DOP values. A query optimizer may also select a DOP value based on one or more factors including runtime conditions. For example, resource requirements such as CPU usage, I/O usage, etc., for a query may be estimated. In a non-limiting example, the resource requirements may be expressed as one or more numeric values. In some embodiments, a minimum time threshold may be defined for a processing entity such as a process; this parameter indicates that the processing entity should at least be occupied with work for a minimum time period as indicated by the minimum time threshold. A DOP value may be automatically determined based on the resource requirements estimated and the minimum time threshold. In an example, for a query that is estimated to take one minute, if a process requires a minimum time threshold of 10 seconds in order to perform useful work, a DOP value of six may be determined. In another example, for a query that is estimated to take ten minutes, if a process requires a minimum time threshold of 10 seconds in order to perform useful work, a DOP value sixty may be determined. It should be noted that other parallelism measures or parameters may be used in addition to or in place of a DOP. For example, the number of available processes may be directly used as a parallelism measure; in that case, the number of distinct values of a data distribution key should be larger than the number of processes available for executing reporting operations.

When a common prefix has a small number of distinct values (NDV), data distribution based on key values of the common prefix for the purpose of parallel execution does not scale well and thus fails to fully leverage a database system's parallel processing resources. For example, in a database system with hundreds, thousands, or more potential processing entities (e.g., processes) available for parallel execution of a database statement, the use of a common prefix (e.g., the "year" column in the table "sales") that has only two distinct values (e.g., "Y1" and "Y2" as illustrated in TABLE 1) for data distribution would cause many available resources to sit idle, resulting in poor performance of the database system.

Scalable Evaluation

To overcome scalability issues associated with a low number of distinct values of a common prefix, scalable computation algorithms as described herein may be used to evaluate reporting window functions. These scalable computation algorithms may include two phases. In the first phase, either an extended data distribution key or a computation pushdown approach is used to distribute input rows among a plurality of operators that perform window aggregation for the reporting window functions. The window aggregation may be partially performed by an operator in the plurality of operators for at least one of the reporting window functions, because the operator may not have all rows necessary for full window aggregation of some or all of the reporting window functions.

In the second phase, a plurality of window consolidation operators (e.g., a type of row source operators) receives all window aggregations broadcasted by the plurality of operators that perform the window aggregations in the first phase. The window consolidation operators are operators configured to perform full aggregation for any reporting window function which is partially evaluated in the first phase. While the window aggregations broadcasted by an individual operator in the plurality of operators can be partial, each of the plurality of window consolidation operators can assemble or consolidate all partial window aggregations in the broadcasted window aggregations, resulting in full window aggregations for all the reporting window functions in the set of reporting window functions.

Extended Data Distribution Key

An extended data distribution key refers to a sequence of partition-by keys not shared by all reporting window functions in a set of reporting window functions specified in a database statement. An extended data distribution key may be a sequence of partition-by keys possessed exclusively by a single reporting window function in the set of reporting window functions. An extended data distribution key may also be a sequence of partition-by keys shared by two or more, but not all, reporting window functions in the set of reporting window functions. In the example database statement as shown in expression (1), an extended data distribution key among the three example reporting window functions may be formed by the "year" column and the "quarter" column of the table "sales". Another extended data distribution key among the three example reporting window functions may be formed by the "year" column, the "quarter" column and the "month" column of the table "sales".

When the database statement is executed in parallel in runtime, data distribution to a plurality of operators/processes that perform window aggregation can be done based on distinct values (or distinct key value combinations) of an extended data distribution key.

Figure 2B:
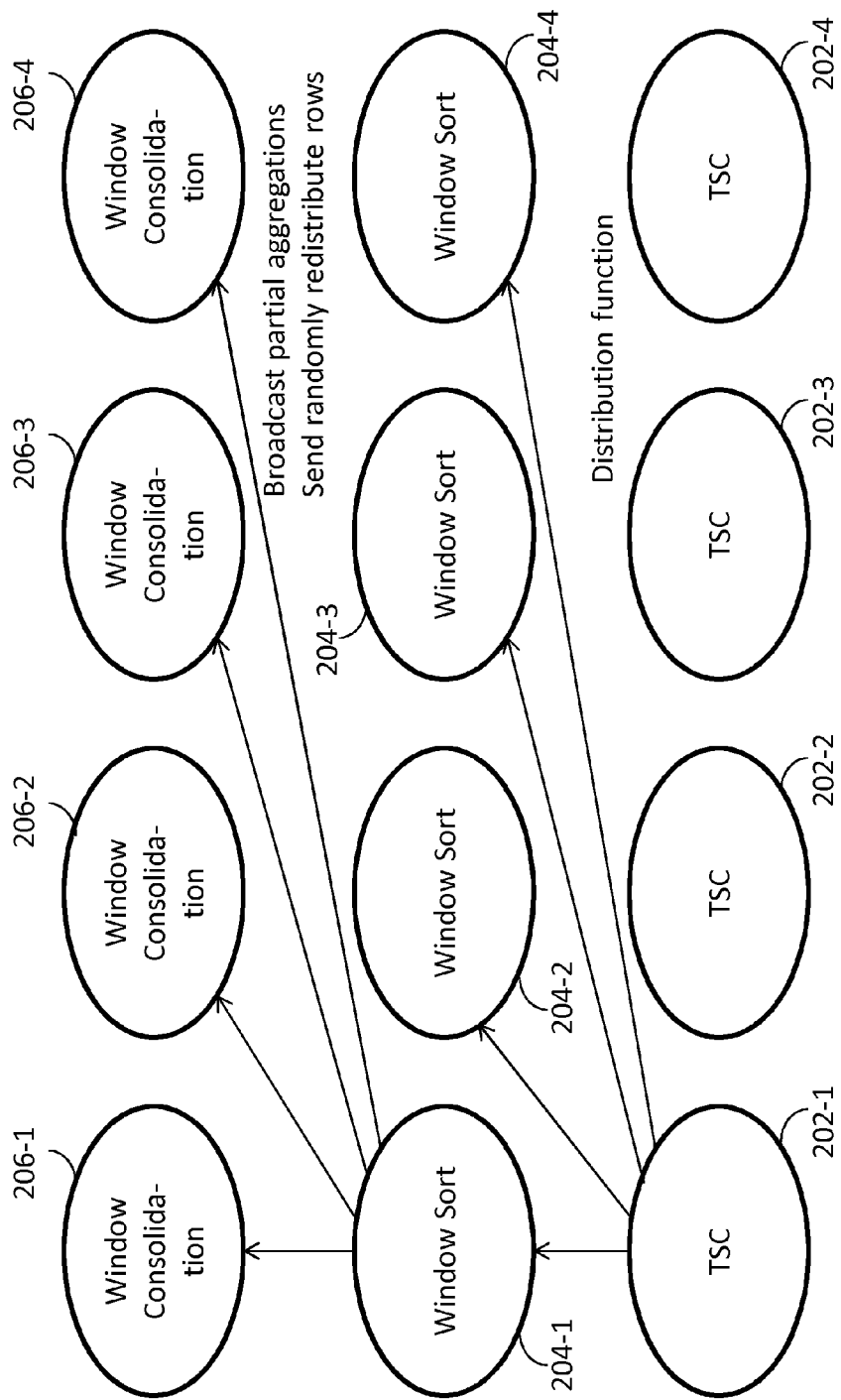

An extended-data-distribution-key execution plan refers to a parallel execution plan for a database statement that uses an extended data distribution key for data distribution. FIG. 2B illustrates an example extended-data-distribution-key execution plan to execute a database statement comprising reporting window functions as illustrated in expression (1). The extended-data-distribution-key execution plan comprises a plurality of table scan (TSC) operators, a plurality of window sort operators and a plurality of window consolidation operators. In runtime each of these operators in the extended-data-distribution-key execution plan may be assigned to a respective process for execution. It should be noted that in some embodiments, the TSC operators and the window sort operators of FIG. 2B may be combined into a plurality of operators such as a plurality of window-sort-and-TSC operators of FIG. 2C that perform both the TSC operations and the window sort operations.

Each window sort operator may be associated with one or more specific distinct values of the extended-data-distribution-key and assigned to evaluate all the reporting window functions using input rows having these specific distinct values of the extended-data-distribution-key. Evaluating reporting window functions by an individual window sort operator in the plurality of window sort operators may only be partially performed for operations such as sum, min/max, average, count, etc., for at least one reporting window operation in the set of reporting window functions. This is so because the input rows, which are distributed to the individual window sort operator, with the specific distinct values of the extended-data-distribution-key may be fewer than the input rows necessary for full window aggregation of a reporting window function. Such a reporting window function, for example, may be specified with a sequence of partition-by keys that do not contain all the partition-by keys of the extended data distribution key.

Each TSC operator of FIG. 2B may be assigned to retrieve (input) rows from a respective number of data blocks in a database table and distribute the retrieved rows to respective window sort operators based on distinct values of the extended data distribution key as indicated in database values of the retrieved rows. A TSC operator may use a distribution function that takes a distinct value of the extended data distribution key indicated by database values of an input row as input and returns the identity of a corresponding window sort operator to which the input row should be sent.

Window sort operators/processes receiving their respective subsets of rows may arrange the received rows based on a shared sort order. The shared sort order may be an order based on values of the extended data distribution key. The shared sort order may be an order based on values of a sequence of partition-by keys that is more specific than the extended data distribution key. Whether partial or full, evaluation (e.g., aggregation, averaging, etc.) of all the reporting window functions in the set of reporting window functions may be performed by an individual window sort operator/process against the same shared sort order.

For the purpose of illustration only, an extended data distribution key is formed by the "year" and "quarter" columns for parallel execution of the database statement as shown in expression (1), in accordance with an extended-data-distribution-key execution plan as illustrated in FIG. 2B. The number of operators in the extended-data-distribution-key may be selected or determined based at least in part on a determination of the NDV of the extended data distribution key and/or a desired DOP value at either runtime or before the runtime. For the purpose of illustration only, four window sort operators 204-1 through 204-4 may be allocated. Input rows with year "Y1" and quarters "Q1" and "Q2" (two distinct values of the extended data distribution key: "Y1" and "Q1"; and "Y1" and "Q2") are distributed to operator 204-1. Input rows with year "Y1" and quarters "Q3" and "Q4" (two distinct values of the extended data distribution key: "Y1" and "Q3"; and "Y1" and "Q4") are distributed to operator 204-2. Input rows with year "Y2" and quarters "Q1" and "Q2" (two distinct values of the extended data distribution key: "Y2" and "Q1"; and "Y2" and "Q2") are distributed to operator 204-3. Input rows with year "Y2" and quarters "Q3" and "Q4" (two distinct values of the extended data distribution key: "Y2" and "Q3"; and "Y2" and "Q4") are distributed to operator 204-4. For a given input row, a TSC operator (e.g., 202-1) may determine a destination window sort operator to which the input row should be sent based on a distribution function that takes the "year" and "quarter" column values from the input row.

Since data distribution made to a plurality of window sort operators/processes is based on the "year" and "quarter" column (which are keys of the extended data distribution key), a window sort operator/process (one of 204-1 through 204-1 in FIG. 2B) may receive and aggregate only a subset of input rows that are not sufficient for fully evaluating at least one (e.g., the "yearly-sales" reporting window functions) of the reporting window functions. For example, window sort operator/process 204-1 receives input rows in the following table:

TABLE 2

| Year | quarter | month | Sale | monthly-sales | quarterly-sales | yearly-sales |
|---|---|---|---|---|---|---|
| Y1 | Q1 | M1 | 3 | 3 | 6 | 15 |
| Y1 | Q1 | M2 | 2 | 2 | 6 | 15 |
| Y1 | Q1 | M3 | 1 | 1 | 6 | 15 |
| Y1 | Q2 | M4 | 2 | 2 | 9 | 15 |
| Y1 | Q2 | M5 | 3 | 3 | 9 | 15 |
| Y1 | Q2 | M6 | 4 | 4 | 9 | 15 |

Similarly, window sort operator/process 204-2 receives input rows in the following table:

TABLE 3

| Year | quarter | month | Sale | monthly-sales | quarterly-sales | yearly-sales |
|---|---|---|---|---|---|---|
| Y1 | Q3 | M7 | 3 | 3 | 12 | 27 |
| Y1 | Q3 | M8 | 4 | 4 | 12 | 27 |
| Y1 | Q3 | M9 | 5 | 5 | 12 | 27 |
| Y1 | Q4 | M10 | 6 | 6 | 15 | 27 |

TABLE 3-continued

| Year | quarter | month | Sale | monthly-sales | quarterly-sales | yearly-sales |
|---|---|---|---|---|---|---|
| Y1 | Q4 | M11 | 5 | 5 | 15 | 27 |
| Y1 | Q4 | M12 | 4 | 4 | 15 | 27 |

Window sort operator/process 204-3 receives input rows in the following table:

TABLE 4

| Year | quarter | month | Sale | monthly-sales | quarterly-sales | yearly-sales |
|---|---|---|---|---|---|---|
| Y2 | Q1 | M1 | 3 | 3 | 10 | 23 |
| Y2 | Q1 | M2 | 2 | 2 | 10 | 23 |
| Y2 | Q1 | M3 | 5 | 5 | 10 | 23 |
| Y2 | Q2 | M4 | 6 | 6 | 13 | 23 |
| Y2 | Q2 | M5 | 3 | 3 | 13 | 23 |
| Y2 | Q2 | M6 | 4 | 4 | 13 | 23 |

Window sort operator/process 204-4 receives input rows in the following table:

TABLE 5

| Year | quarter | month | Sale | monthly-sales | quarterly-sales | yearly-sales |
|---|---|---|---|---|---|---|
| Y2 | Q3 | M7 | 7 | 7 | 16 | 35 |
| Y2 | Q3 | M8 | 4 | 4 | 16 | 35 |
| Y2 | Q3 | M9 | 5 | 5 | 16 | 35 |
| Y2 | Q4 | M10 | 6 | 6 | 19 | 35 |
| Y2 | Q4 | M11 | 5 | 5 | 19 | 35 |
| Y2 | Q4 | M12 | 8 | 8 | 19 | 35 |

Under a parallel execution strategy that employs an extended data distribution key for data distribution, an operator or a process working on its respective input rows or data partitions requires locally aggregated information about other input rows or data partitions processed by other operators or parallel executing processes, in order to fully evaluate the reporting window functions. In the present example, window sort operator 204-1 of FIG. 2B only has a partial aggregated value for the "yearly-sales" reporting window function in the set of reporting window functions after window sort operator 204-1 finishes window function computation on the input rows or data partitions which window sort operator 204-1 has received. Reporting window functions for which operators or parallel executing processes executing the operators have partial aggregated values may be referred to herein as "to-be-consolidated" window functions. Apparently, these "to-be-consolidated" window functions have relatively low—as compared with the desired DOP value or as compared with the desired DOP value multiplied by a scaling factor (e.g., 2, 3, etc.)—NDVs in their own sequences of partition-by keys based on a query optimizer's statistical estimation. Otherwise, one or more of their own sequences of partition-by keys would have been chosen to be data distribution keys or extended data re-distribution keys in order to avoid partial aggregated values to the extent possible for these "to-be-consolidated" window functions.

A second consolidation phase is used to compute the full aggregated values of these "to-be-consolidated" window functions. Data received and processed by window sort operators or parallel executing processes is redistributed to another set of parallel executing processes implementing window consolidation operators (e.g., 206-1 through 206-4 of FIG. 2B). The window consolidation operators (206-1 through 206-4 of FIG. 2B) perform the consolidation of partial aggregated values of "to-be-consolidated" window functions and return result rows with fully aggregated values (as illustrated in TABLE 1) for all the reporting window functions in the set of reporting window functions.

In some embodiments, window sort operators 204-1 through 204-4 first broadcast the partially aggregated values for those "to-be-consolidated" window functions to window consolidation operators 206-1 through 206-4. The broadcasted data is expected to have a small size due to the fact that those "to-be-consolidated" window functions have low NDVs on their sequences of partition-by keys. In the present example, there is only one reporting window function, "yearly-sales", for which the partially aggregated values (one from each of window sort operators 204-1 through 204-4) are to be broadcasted to the window consolidation operators. For example, window sort operator 204-1 broadcasts the partially aggregated value "15" in TABLE 2 to each of window consolidation operators 206-1 through 206-4. Similarly, window sort operators 204-2 through 204-4 broadcast the partially aggregated values "27", "23" and "35" in TABLEs 3, 4 and 5, respectively, to each of window consolidation operators 206-1 through 206-4.

The partial aggregated values of the "to-be-consolidated" window functions may be broadcasted by window sort operators 204-1 through 204-4 with partition-by key values of the "to-be-consolidated" reporting window functions. Each of window consolidation operator (206-1 through 206-4) consolidates these partial aggregated values and places the consolidated values into hash tables with the partition-by key values as hash keys. The term "consolidate" or "consolidation" may mean specific consolidation operations for specific types of reporting window functions, for example, summing partial sums for a sum( ) reporting window function, summing partial counts for a count( ) reporting window function, etc. In the present example, the "yearly-sales" reporting window function is a "to-be-consolidated" window function. Year "Y1" corresponds to two partial aggregated values "15" and "27" of the "yearly-sales" reporting window function, and is hence used by each window consolidation operator as a hash key to consolidate the two partial aggregated values "15" and "27" to "42" for year "Y1" and place the consolidated value "42" of the "yearly-sales" reporting window function in a hash table for the same ("to-be-consolidated") reporting window function, "yearly-sales". Similarly, year "Y2" corresponds to two partial aggregated values "23" and "35" of the "yearly-sales", and is hence used by each window consolidation operator as a hash key to consolidate and place the two partial aggregated values "23" and "35" (consolidated to "58" for year "Y2") of the "yearly-sales" reporting window function in a hash table for the same ("to-be-consolidated") reporting window function.

In an embodiment, window sort operators 204-1 through 204-4, or the parallel executing processes implementing these operators at runtime, are configured to randomly redistribute input rows (received by individual window sort operators 204-1 through 204-4 from TSC operators 202-1 through 202-4 based on a distribution function such as a hash function hash(year, quarter)) among window consolidation operators 206-1 through 206-4. Each of the randomly redistributed input rows comprises non-reporting window function columns (in the present example, retrieved database values for "year", "quarter", "month", "sale", etc.) and/or may be expanded with columns that carry fully aggregated values of any reporting window functions with fully aggregated values. In the present example, full aggregated values (e.g., the "monthly-sales" value "3" and the "quarterly-sales" value "10" for year "Y2", quarter "Q1" and month "M1"; the "monthly-sales" value "2" and the "quarterly-sales" value "9" for year "Y1", quarter "Q2" and month "M4"; etc.) for the "quarterly-sales" and "monthly-sales" reporting window functions may be carried by newly expanded columns (e.g., "quarterly-sales" and "monthly-sales") in input rows corresponding to respective partition-by key values (e.g., year "Y2", quarter "Q1" and month "M1"; year "Y1", quarter "Q2" and month "M4"; etc.).

After the input rows with expanded columns are received by a window consolidation operator (e.g., 206-1), for each of the input rows, the window consolidation operator (206-1) probes hash tables (hash tables are for illustration only; any access structure for one or more sorting, looking up or grouping operations may be used in place of hash tables) to get fully aggregated values for the "to-be-consolidated" window functions based on partition-by key values carried by that input row. In the present example, for an input row carrying partition-by key values of year "Y2", quarter "Q1" and month "M1", the window consolidation operator (206-1) probes the hash table with a hash key of year "Y2" for the "to-be-consolidated" window function, "yearly-sales", to get a fully aggregated value "58". Accordingly, the window consolidation operator (206-1) may place the fully aggregated value "58" into an expanded column "yearly-sales" of the input row corresponding to year "Y2". In some embodiments, the expanded column "yearly-sales" of the input row may initially contain a null value when the input row was received by the window consolidation operator (206-1) from a window sort operator (e.g., 204-3). It should be noted that consolidation of partially aggregated values of reporting window functions may be performed by a single process such as a query coordinator or by multiple processes such as the window consolidator operators. The use of a single consolidation process may reduce redundant consolidation as compared with the approach of using multiple window consolidators, but has the caveat that the single consolidation process such as the query coordinator may be overloaded. In addition, when multiple consolidation processes are used, an alternative way of carrying out the consolidation of partially evaluated reporting window functions is for one or more of the multiple processes to do its respective consolidation and pass its respective consolidated results to others of the multiple processes via shared memory over a communication network. For example, consolidation can be done in the following non-exhaustive list of possible configurations: (1) by the query coordinator; (2) by one process; (3) by one process per instance; or (4) by all participating consolidator processes. In the cases of (1), (2) and (3), the consolidated results can be communicated to the processes that perform window consolidation operations. In the case of (4), since each consolidation process performs consolidation, no communication such as used in the cases of (1), (2) and (3) is required. In some embodiments, additionally, optionally, or alternatively, one window consolidator may be deployed on each instance with shared-memory communication capability.

One or more operators, for example, window consolidation operators 206-1 through 206-4, may return the input rows with fully aggregated values (or consolidated values) for all reporting window functions in the set of reporting window functions as a result set (e.g., TABLE 1) of the database statement.

Computation Pushdown

Computation pushdown refers to an approach of pushing down, or placing, one or more operations related to generating a result set with aggregated values of reporting window function into producer operators. Each of the producer operators may be tasked to produce input rows for partial evaluation of reporting window functions based on the input rows. Examples of producers include but not limited to table scans, joins, aggregations, subqueries, etc. from table scans, joins, sub-queries, nested queries, logical views, etc.

Figure 2C:
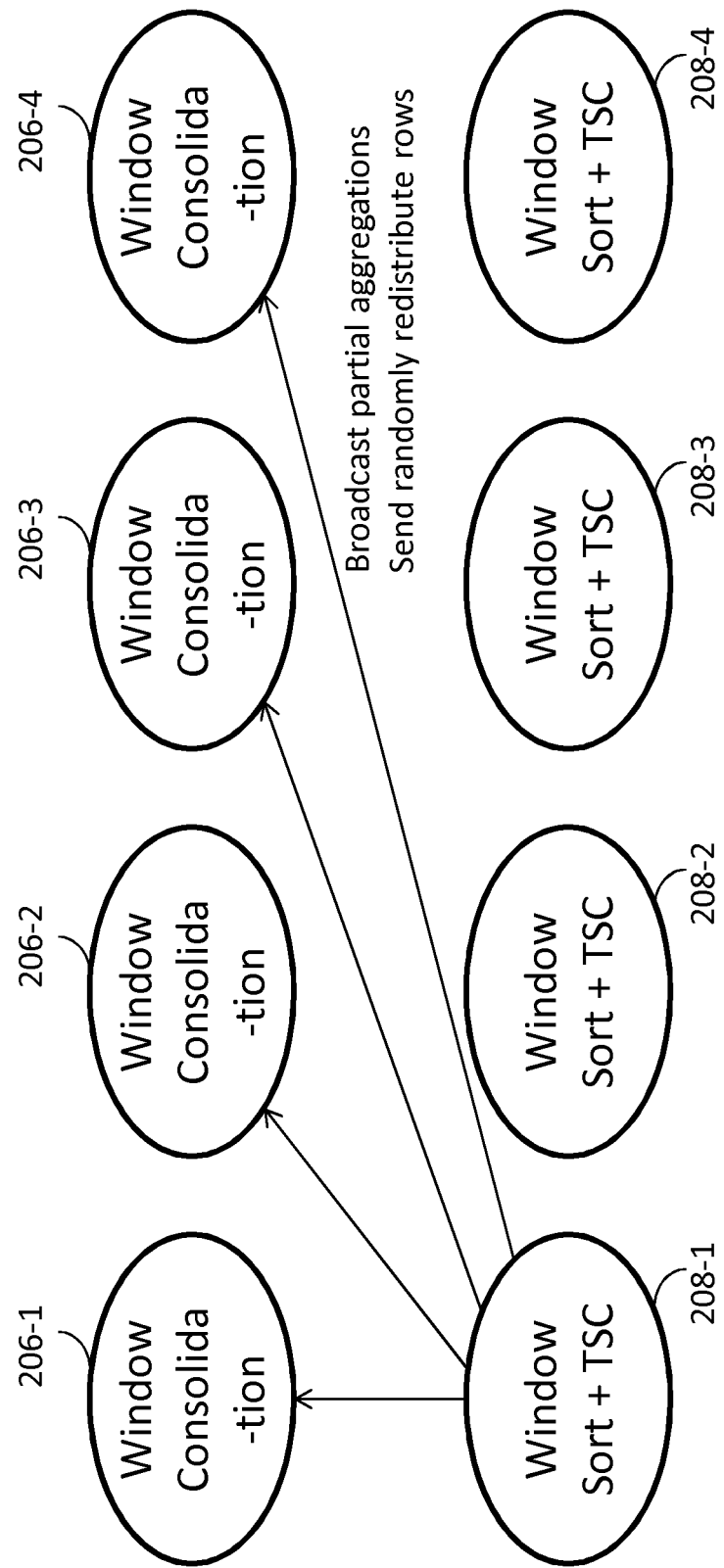

A computation-pushdown execution plan refers to a parallel execution plan for a database statement that uses computation pushdown for data distribution. FIG. 2C illustrates an example computation-pushdown execution plan to execute a database statement comprising reporting window functions as illustrated in expression (1). The computation-pushdown execution plan comprises a plurality of (combined) window sort and table scan (TSC) operators (e.g., 208-1 through 208-4) and a plurality of window consolidation operators (206-1 through 206-4 of FIG. 2C). Each of these operators in the computation-pushdown execution plan may be assigned to a respective process for execution in runtime.

In the computation-pushdown execution plan, each window-sort-and-TSC operator may not be associated only with specific distinct values of a common prefix or an extended-data-distribution-key. Instead, each window-sort-and-TSC operator may be assigned to evaluate all reporting window functions in a set of reporting window functions of the database statement using input rows; the input rows may be retrieved from one or more data blocks from which the window-sort-and-TSC operator is assigned to read. Evaluating reporting window functions by an individual window-sort-and-TSC operator in the plurality of window-sort-and-TSC operators may only be partially performed for operations such as sum, min/max, average, count, etc., for all the reporting window operations in the set of reporting window functions. This is so because input rows available to a specific window-sort-and-TSC operator (e.g., 208-1) may be fewer than all input rows necessary for full window aggregation of a reporting window function, as some of the input rows necessary for the full window aggregation of the reporting window function may be produced or read by other window-sort-and-TSC operators (e.g., one or more of 208-2 through 208-4).

Each window-sort-and-TSC operator may be assigned to retrieve (input) rows or records from a size-comparable portion of data blocks in a database table. A window-sort-and-TSC operators/process (e.g., 208-1) receives or produces its respective subsets of rows, which may be of any key values of partition-by keys of any reporting window function in the set of window functions. The window-sort-and-TSC operators/process (208-1) arranges the received rows based on a shared sort order. The shared sort order may be an order based on distinct values of a sequence of partition-by keys in a set of sequences of partition-by keys associated with the set of reporting window functions. In a particular embodiment, the shared sort order may be an order based on distinct values of the longest sequence of partition-by keys in the set of sequences of partition-by keys. Partial evaluation (e.g., aggregation, averaging, etc.) of all the reporting window functions in the set of reporting window functions may be performed against the same shared sort order. For the purpose of illustration, window sort and sort operator/process 208-1 receives and sorts input rows based on a share sort order as defined by key values of the partition-by keys "Year", "Quarter", and "month" of the "monthly-sales" reporting window function.

Each window sort and sort operator/process (e.g., 208-1) may be configured to expand each of the input rows with additional columns to store values of all the reporting window functions ("monthly-sales", "quarterly-sales", "yearly-sales"). Window sort and sort operator/process 208-1 may be configured to partially aggregate the input rows for all the window functions, and store partially aggregated values of all the reporting functions as shown in the following table:

TABLE 6

| Year | quarter | month | sale | monthly-sales | quarterly-sales | yearly-sales |
|------|---------|-------|------|---------------|-----------------|--------------|
| Y1 | Q1 | M1 | 3 | 3 | 3 | 21 |
| Y1 | Q3 | M8 | 4 | 4 | 9 | 21 |
| Y1 | Q3 | M9 | 5 | 5 | 9 | 21 |
| Y2 | Q2 | M4 | 6 | 6 | 9 | 26 |
| Y2 | Q2 | M5 | 3 | 3 | 9 | 26 |
| Y2 | Q4 | M12 | 8 | 8 | 8 | 26 |

Similarly, window sort and sort operator/process 208-2 receives and sorts input rows based on the share sort order as defined by key values of the partition-by keys "Year", "Quarter", and "month". Window sort and sort operator/process 208-2 may be configured to partially aggregate the input rows for all the window functions, and store partially aggregated values of all the reporting functions as shown in the following table:

TABLE 7

| Year | quarter | month | sale | monthly-sales | quarterly-sales | yearly-sales |
|------|---------|-------|------|---------------|-----------------|--------------|
| Y1 | Q1 | M2 | 2 | 2 | 3 | 8 |
| Y1 | Q1 | M3 | 1 | 1 | 3 | 8 |
| Y1 | Q2 | M4 | 2 | 2 | 2 | 8 |
| Y2 | Q3 | M9 | 5 | 5 | 5 | 16 |
| Y2 | Q4 | M10 | 6 | 6 | 11 | 16 |
| Y2 | Q4 | M11 | 5 | 5 | 11 | 16 |

Window sort and sort operator/process 208-3 receives and sorts input rows based on the share sort order as defined by key values of the partition-by keys "Year", "Quarter", and "month". Window sort and sort operator/process 208-3 may be configured to partially aggregate the input rows for all the window functions, and store partially aggregated values of all the reporting functions as shown in the following table:

TABLE 8

| Year | quarter | Month | sale | monthly-sales | quarterly-sales | yearly-sales |
|------|---------|-------|------|---------------|-----------------|--------------|
| Y1 | Q2 | M5 | 3 | 3 | 3 | 7 |
| Y1 | Q4 | M12 | 4 | 4 | 4 | 7 |
| Y2 | Q1 | M1 | 3 | 3 | 5 | 16 |
| Y2 | Q1 | M2 | 2 | 2 | 5 | 16 |
| Y2 | Q3 | M7 | 7 | 7 | 11 | 16 |
| Y2 | Q3 | M8 | 4 | 4 | 11 | 16 | window sort and sort operator/process 208-4 receives and sorts input rows based on the share sort order as defined by key values of the partition-by keys "Year", "Quarter", and "month". Window sort and sort operator/process 208-4 may be configured to partially aggregate the input rows for all the window functions, and store partially aggregated values of all the reporting functions as shown in the following table:

TABLE 9

| Year | quarter | Month | sale | monthly-sales | quarterly-sales | yearly-sales |
|------|---------|-------|------|---------------|-----------------|--------------|
| Y1 | Q2 | M6  | 4 | 4 | 4  | 18 |
| Y1 | Q3 | M7  | 3 | 3 | 3  | 18 |
| Y1 | Q4 | M10 | 6 | 6 | 11 | 18 |
| Y1 | Q4 | M11 | 5 | 5 | 11 | 20 |
| Y2 | Q1 | M3  | 5 | 5 | 5  | 20 |
| Y2 | Q2 | M6  | 4 | 4 | 4  | 20 |

Under the computation-pushdown execution strategy, an operator or process working on input data items of its respective data portions or data partitions may require information about other input data items processed by other operators or parallel executing processes to fully evaluate or aggregate all the reporting window functions. In the present example, each of window-sort-and-TSC operators 208-1 through 208-4 may have only a partial aggregated value for the reporting window functions in the set of reporting window functions after the window-sort-and-TSC operator finishes window function computation on the input rows the window-sort-and-TSC operator received. Thus, all the reporting window functions are "to-be-consolidated" window functions. These "to-be-consolidated" window functions have relatively low NDVs, in relation to the desired DOP, on their partition-by keys based on a query optimizer's statistical estimation, as otherwise a common prefix or an extended data distribution key could have been chosen in order to avoid partial aggregated values for at least one of the reporting window functions.

A second consolidation phase may be used to compute the full aggregated values of the "to-be-consolidated" window functions. Data received and processed by individual window-sort-and-TSC operators (e.g., 208-1 through 208-4 of FIG. 3C) or parallel executing processes implementing these operators are (e.g., randomly) redistributed to another set of parallel executing processes implementing window consolidation operators (e.g., 206-1 through 206-4 of FIG. 2C). Each of the window consolidation operators (206-1 through 206-4 of FIG. 2C) performs the consolidation of partial aggregated values of "to-be-consolidated" window functions and returns resulting rows (e.g., input rows each with expanded columns for the reporting window functions) with fully aggregated values for all the reporting window functions in the set of reporting window functions of the database statement.

In some embodiments, window-sort-and-TSC operators 208-1 through 208-4 first broadcast the partially aggregated values for each of the "to-be-consolidated" window functions to window consolidation operators 206-1 through 206-4 of FIG. 2C. The broadcasted data is expected to have a small size, as those "to-be-consolidated" window functions have low NDVs on their partition-by keys.

In the present example, all three reporting window functions may comprise partially aggregated values from each of window sort operators 204-1 through 204-4. Partially aggregated values for each of the three reporting window function are broadcasted by each of window-sort-and-TSC operators 208-1 through 208-4 to the window consolidation operators. For example, for the reporting window function "quarterly-sales", window-sort-and-TSC operator 208-1 broadcasts the partially aggregated values "3", "9", "9", and "8" (which correspond to the partially aggregated values for year "Y1" and "quarter "Q1"; year "Y1" and quarter "Q3"; year "Y2" and quarter "Q2"; and year "Y2" and "quarter "Q4") in TABLE 6 to each of window consolidation operators 206-1 through 206-4.

In the computation-pushdown execution strategy, each of all the reporting window functions may be partially aggregated by window-sort-and-TSC operators and then consolidated by consolidation operators. For the purpose of illustration only, the "quarterly-sales" reporting window function is used to illustrate how this strategy may be carried out. It should be understood that each of the other reporting window functions such as "yearly-sales" or "monthly-sales" may be similarly evaluated. As can be seen in TABLE 6, some partially aggregated values may be repeated in multiple rows. For example, two input rows processed by window-sort-and-TSC operator 208-1 carry the partially aggregated value "9" for year "Y1" and "Q3". To avoid over-accounting of these repeated values, after partial aggregation is performed for all input rows by a window-sort-and-TSC operator such as 208-1, the window-sort-and-TSC operator (208-1) sequentially traverses through all the input row along the shared sort order and broadcasts only the partially aggregated value of the reporting window function in the last row immediately after which a data partition crossover or an end-of-data is detected. For example, for the reporting window function "quarterly-sales", as window-sort-and-TSC operator 208-1 sequentially traverses the input rows after the partial aggregation for the reporting window function is performed, a data partition crossover for the reporting window function, from a data partition of year "Y1" and quarter "Q1" to another data partition of year "Y1" and quarter "Q3", is detected when the second row of TABLE 6 is processed. At that point, the partially aggregated value "3" of the reporting window function in the last row (input row 1) from the currently processed row (input row 2) is broadcasted by window-sort-and-TSC operator 208-1 to all the window consolidation operators. A data partition crossover for the reporting window function is not detected when the third row of TABLE 6 is processed as both the second and third rows belong to the same data partition of year "Y1" and quarter "Q3" for the reporting window function. At that point, the partially aggregated value "9" of the reporting window function in the last row (input row 2) from the currently processed row (input row 3) is not broadcasted by window-sort-and-TSC operator 208-1 to all the window consolidation operators. On the other hand, a data partition crossover for the reporting window function is again detected when the fourth row of TABLE 6 is processed as the third and fourth rows belong to two different data partitions of year "Y1" and quarter "Q3" and of year "Y2" and "Q2" for the reporting window function. At that point, the partially aggregated value "9" of the reporting window function in the last row (input row 2) from the currently processed row (input row 3) is broadcasted by window-sort-and-TSC operator 208-1 to all the window consolidation operators.

Similarly, window sort operators 204-2 through 204-4 broadcast the partially aggregated values for each of the reporting window functions in TABLEs 7, 8 and 9, respectively, to each of window consolidation operators 206-1 through 206-4, whenever a data partition crossover for the each of the reporting window functions is detected in sequential traversals of input rows.

The partial aggregated values for each "to-be-consolidated" window function, as aggregated and broadcasted by window sort operators 204-1 through 204-4, may be consolidated and placed into hash tables or any mechanism to lookup values based on keys with corresponding partition-by key values (which are associated with or correspond to the broadcasted partial aggregated values) of a respective sequence of partition-by keys of the "to-be-consolidated" window function as hash keys, as explained above with the extended data distribution key execution strategy.

In some embodiments, each of window-sort-and-TSC operators 208-1 through 208-4, or the parallel executing processes implementing these operators at runtime, is configured to randomly redistribute input rows among window consolidation operators 206-1 through 206-4. Each of the randomly redistributed input rows comprises non-reporting window function values (in the present example, retrieved database values for "year", "quarter", "month", "sale", etc.) and may be expanded to carry null values of any reporting window functions. After the input rows with expanded columns are received by a window consolidation operator (e.g., 206-1), for each of the input rows, the window consolidation operator (206-1) probes hash tables to get fully aggregated values for the "to-be-consolidated" window functions based on has keys derived from partition-by key values carried by that input row. Each of the hash tables contains fully aggregated values of a corresponding window reporting function that are aggregated from the broadcasted partially aggregated values. In the present example, for an input row carrying partition-by key values of year "Y1", quarter "Q2" and month "M6", the window consolidation operator (206-1) probes a first hash table for the "to-be-consolidated" window function, "monthly-sales", to get a fully aggregated value "4" with a hash key of year "Y1", quarter "Q2" and month "M6". Accordingly, the window consolidation operator (206-1) may place the fully aggregated value "4" into an expanded column "monthly-sales" of the input row. In some embodiments, the expanded column "monthly-sales" of the input row may initially contain a null value when the input row was received by the window consolidation operator (206-1) from a window-sort-and-TSC operator (e.g., 208-4). Similarly, for the same input row, the window consolidation operator (206-1) probes a second hash table for the "to-be-consolidated" window function, "quarterly-sales", to get a fully aggregated value "9" with a hash key of year "Y1" and quarter "Q2". Accordingly, the window consolidation operator (206-1) may place the fully aggregated value "9" into an expanded column "quarterly-sales" of the input row. Also, for the same input row, the window consolidation operator (206-1) probes a third hash table for the "to-be-consolidated" window function, "yearly-sales", to get a fully aggregated value "42" with a hash key of year "Y1". Accordingly, the window consolidation operator (206-1) may place the fully aggregated value "42" into an expanded column "yearly-sales" of the input row. The same steps may be similarly performed in parallel by each of the remaining window consolidation operators 206-2 through 206-4.

One or more operators, for example window consolidation operators 206-1 through 206-4, may return the input rows with fully aggregated values (or consolidated values) for all reporting window functions in the set of reporting window functions as a result set (e.g., TABLE 1) of the database statement.

It has been described that double counting of partially aggregated values can be prevented by detecting partition boundaries in a shared sort order. However, other ways of providing partially aggregated values between two sets of parallel executing processes may be used, including those not based on a shared sort order. For example, instead of storing and repeating partially aggregated values in multiple rows with the same values of partition-by columns, the partially aggregated values can be separately stored in one or more lookup tables with distinct values of partition-by keys, instead of being repeated in multiple rows. The distinct values of partition-by keys can be provided to window consolidation operators with the partially aggregated values of reporting window functions. The consolidation operators can consolidate the partially aggregated values using the distinct values of partition-by columns provided with the partially aggregated values.

Broadcast and Consolidation of Partial Aggregated Values

As has been described and will be further described, partial aggregated values for to-be-consolidated reporting window functions can be broadcasted from a first set of parallel executing processes such as window sort operators to a second set of parallel executing processes such as window consolidation operators. In some embodiments, partial aggregated values of each to-be-consolidated reporting window function can be broadcasted with values of partition-by columns of that to-be-consolidated reporting window function. In some embodiments, only partial aggregated values of the to-be-consolidated reporting window function that has the most columns are broadcasted with its values of partition-by columns; these partially aggregated values can be used by window consolidation operators to derive full evaluated aggregated values of all to-be-consolidated reporting window functions.

For the purpose of illustration only, an extended data distribution key comprising the "year", "quarter" and "month" columns is used to distribute data from (e.g., two) window sort operators to a plurality of window consolidation operators. The to-be-consolidated reporting window functions are the "yearly-sales" and "quarterly-sales" reporting window function the latter of which has the most (or the more) columns among the two to-be-consolidated reporting window functions. The first of the two window sort operators computes, based on its subset of input data (different from and unrelated to the input data of TABLEs 1-9), partially aggregated values of the "quarterly-sales" reporting window function, as shown in the following table:

TABLE 10

| Year | quarter | Month | Sale | yearly-sales (local) | quarterly-sales (local) | *notes* |
|---|---|---|---|---|---|---|
| Y1 | Q1 | M1 | 1 | 9 | 5 | |
| Y1 | Q1 | M1 | 1 | 9 | 5 | |
| Y1 | Q1 | M1 | 1 | 9 | 5 | |
| Y1 | Q1 | M2 | 1 | 9 | 5 | |
| Y1 | Q1 | M3 | 1 | 9 | 5 | |
| Y1 | Q2 | M4 | 1 | 9 | 4 | A new combination of partition-by column values is found for the "year" and "quarter" columns: broadcast the "quarterly-sales" value 5 with partition-by column values "Y1" and "Q1" in the previous row; |
| Y1 | Q2 | M5 | 1 | 9 | 4 | |
| Y1 | Q2 | M6 | 1 | 9 | 4 | |
| Y1 | Q2 | M6 | 1 | 9 | 4 | |
| Y2 | Q1 | M1 | 1 | 7 | 4 | A new combination of partition-by column values is found for the "year" and "quarter" columns: broadcast the "quarterly-sales" value 4 with partition- |

TABLE 10-continued

| Year | quarter | Month | Sale | yearly-sales (local) | quarterly-sales (local) | *notes* |
|---|---|---|---|---|---|---|
| | | | | | | by column values "Y1" and "Q2" in the previous row; Also, a new partition-by column value is found for the "year" column: in some embodiments, broadcast the "yearly-sales" value 9 with partition-by column values "Y1" in the previous row |
| Y2 | Q1 | M2 | 1 | 7 | 4 | |
| Y2 | Q1 | M2 | 1 | 7 | 4 | |
| Y2 | Q1 | M3 | 1 | 7 | 4 | |
| Y2 | Q2 | M4 | 1 | 7 | 3 | A new combination of partition-by column values is found; broadcast the "quarterly-sales" value 4 with partition-by column values "Y2" and "Q1" in the previous row |
| Y2 | Q2 | M5 | 1 | 7 | 3 | |
| Y2 | Q2 | M6 | 1 | 7 | 3 | End of data: broadcast the "quarterly-sales" value 3 with partition-by column values "Y2" and "Q2" in the present last row; end of data: in some embodiments, also broadcast the "yearly-sales" value 7 with partition-by column values "Y2" in the previous row |

In some embodiments, each row in the above table contains a column to store an aggregated value of the "monthly-sales" reporting window function as computed by the first window sort operator. In some embodiments, only the "quarterly-sales" reporting window function values are broadcasted by the first window sort operator to the window consolidation operators.

Similarly, the second of the two window sort operators computes, based on its subset of input data (different from and unrelated to the input data of TABLEs 1-9), partially aggregated values of the "yearly-sales" and "quarterly-sales" reporting window functions. For the purpose of illustration only, the second window sort operator has rows parallel to those shown in TABLE 10. In some embodiments, only the "quarterly-sales" reporting window function values are broadcasted by the second window sort operator to the window consolidation operators.

Each of the window consolidation operators can consolidate the partial aggregated results of the "quarterly-sales" reporting window function from the two window sort operators into fully aggregated results of both the "yearly-sales" and "quarterly-sales" reporting window functions, as shown in the following table:

TABLE 11

| Year | quarter | quarterly-sales (local) | yearly-sales (global) | quarterly-sales (global) | *notes* |
|---|---|---|---|---|---|
| Y1 | Q1 | 5 | 18 | 10 | First row, insert "Y1", "Q1", "18" and "10" into hash table |
| Y1 | Q1 | 5 | 18 | 10 | |
| Y1 | Q2 | 4 | 18 | 8 | A new combination of partition-by column values "Y1" and "Q2" is found; insert "Y1", "Q2", "18" and "8" into hash table |
| Y1 | Q2 | 4 | 18 | 8 | |
| Y2 | Q1 | 4 | 14 | 8 | A new combination of partition-by column values "Y2" and "Q1" is found; insert "Y2", "Q1", "14" and "8" into hash table |
| Y2 | Q1 | 4 | 14 | 8 | |
| Y2 | Q2 | 3 | 14 | 6 | A new combination of partition-by column values "Y2" and "Q2" is found; insert "Y2", "Q2", "14" and "6" into hash table |
| Y2 | Q2 | 3 | 14 | 6 | |

As can be seen above, to-be-consolidated reporting window functions with columns fewer than columns of another to-be-consolidated reporting window function may be fully aggregated by parallel executing processes that perform consolidation based on the aggregated results of the other to-be-consolidated reporting window function. In some embodiments, a to-be-consolidated reporting window function with column(s) fewer than columns of other to-be-consolidated reporting window function(s) may be fully aggregated by parallel executing processes that perform consolidation based on the partial results of the to-be-consolidated reporting window function. In some embodiments, the former to-be-consolidated reporting window functions optionally need not to even be partially evaluated prior to the window consolidation operators, but instead can be fully evaluated by the window consolidation operators based on the aggregated results of the latter to-be-consolidated window function that has the most columns. Furthermore, the fully aggregated values of all the to-be-consolidated reporting window functions can be stored in a lookup table (e.g., hash table) with the distinct values of the columns of the formerly to-be-consolidated reporting window function that has the most partition-by columns. For a given row, column values of partition-by columns for each formerly to-be-consolidated reporting window function as determined from the given row can be used as a lookup key to the lookup table to locate a fully aggregated value of the formerly to-be-consolidated reporting window function. The fully aggregated value can be stored with or added into the given row in a result set.

Execution Plan Generation

FIG. 1B is a block diagram that depicts the generation of exemplary query execution plans using a query optimizer. FIG. 1B depicts a query execution plan generator 115, a query optimizer 126, a common-prefix execution plan 128A, an extended-data-distribution-key execution plan 128B, a computation-pushdown execution plan 128C, a database storage subsystem 150, and a database query 198 (e.g., expression (1)). Database storage subsystem 150 includes static query statistics 151. Common-prefix execution plan 128A includes TSC operators 202 and window sort operators 204. Extended-data-distribution-key execution plan 128B includes TSC operators 202, window sort operators 204, and window consolidation operators 206. Computation-pushdown execution plan 128C includes window-sort-and-TSC operators 208 and window consolidation operators 206. With respect to FIG. 1B, like numbered elements may correspond to the same elements from FIG. 1A.

In FIG. 1B, a database query 198, which is a database statement (e.g., expression (1)) comprising a set of reporting window functions, is provided for processing by database system 100 of FIG. 1A. Database query 198 is carried out on a "sales" table corresponding to TABLE 1. The "sales" table may be stored in database table 152 of FIG. 1A. Specifically, database query 198 is structured as a database statement (e.g., SQL statement) as illustrated in expression (1). In this manner, a user can retrieve individual input rows with "monthly-sales", "quarterly-sales", and "yearly-sales".

As shown in FIG. 1B, the database query 198 is processed through query execution plan generator 115. An intermediate execution plan may result, which is further processed through query optimizer 126. Query optimizer 126 may modify the intermediate execution plan based on the estimated number of distinct values of sequences and common prefixes of partition-by keys. In response to determining that a common prefix with a sufficient number of distinct values for data distribution in parallel execution exists, a common-prefix execution plan such as 128A is provided, where full aggregation is only carried out at window sort operators 204. In response to determining that an extended data distribution key with a sufficient number of distinct values for data distribution in parallel execution exists, an extended-data-distribution-key execution plan such as 128B is provided, where partial aggregation is carried out at window sort operators 204 for at least one of the reporting window functions and full aggregation is carried out at window consolidation operators 206 for the at least one of the reporting window functions. In response to determining that neither a common prefix nor an extended data distribution key with a sufficient number of distinct values for data distribution in parallel execution exists, a computation-pushdown execution plan such as 128C is provided, where window sort computation is pushed down into producer operators (e.g., pushed down into TSC operators), partial aggregation is carried out at window-sort-and-TSC operators 208 for all the reporting window functions, and full aggregation is carried out at window consolidation operators 206 for the all the reporting window functions.

It may be noted that database query 198 only contains a single set of reporting window functions for simplicity. However, database query 198 may also include multiple set of reporting window functions, each set maybe evaluated in a similar manner by query optimizer 126. Additionally, it can be observed that execution plans 128A, 128B and 128C are two-level and three-level plans in which TSC operators and window-sort-and-TSC operators are record (or input row) sources for window sort operators and for window consolidation operators, respectively. However, the methods and procedures discussed in the present application are generally applicable for producer operators of any execution plan, regardless of complexity or specific structure. Thus, record sources for window sort operators or window consolidation operators are not restricted to table scans and could be other operators such as table joins or even other window sort operators or window consolidation operators.

Statistics Drawbacks

Query optimizer 126 uses static query statistics 151 from database storage subsystem 150 to estimate various distinct values of sequences/subsequences of partition-by keys of reporting window functions that may be expected from database query 198. Static query statistics 151 may include data concerning prior queries against database table 152 and various numbers of distinct values observed. However, since static query statistics 151 is based on past data and may be updated on an infrequent periodic basis, static query statistics 151 may reflect an outdated and stale model of the actual data records stored in database table 152 of database storage subsystem 150. Presence of filter predicates, joins, etc., in a database statement complicates any determination of statistics that could maintain accuracy at runtime. Thus, the data available in static query statistics 151 may not directly address the specific set of reporting window functions requested in database query 198. As a result, the estimated numbers of distinct values from query optimizer 126 may be inaccurate, precluding correct optimization of execution plans.

Adaptive Parallel Execution Plan

To overcome the shortcomings of the query optimizer approach, an adaptive parallel execution approach is introduced. As used herein, the term "adaptive" means that a set of parallel executing processes in runtime, initially execute one of common prefix, extended key and pushdown plans, monitor the actual numbers of distinct values of all combinations of partition-by keys (e.g., from a reporting window function that specifies the largest number of partition-by keys) including any common prefix based on input rows produced in the runtime (by some of the processes), and perform adaptive processing in response to determining that the actual number of distinct values of a distribution key (a common prefix or one of one or more extended keys) comprising a minimal number of columns is sufficient to support a desired degree of parallelism. If none of the combinations of partition-by keys including any common fix has a sufficient number of distinct values, a computation-pushdown execution plan as shown in FIG. 2C can be used.

Figure 2D:
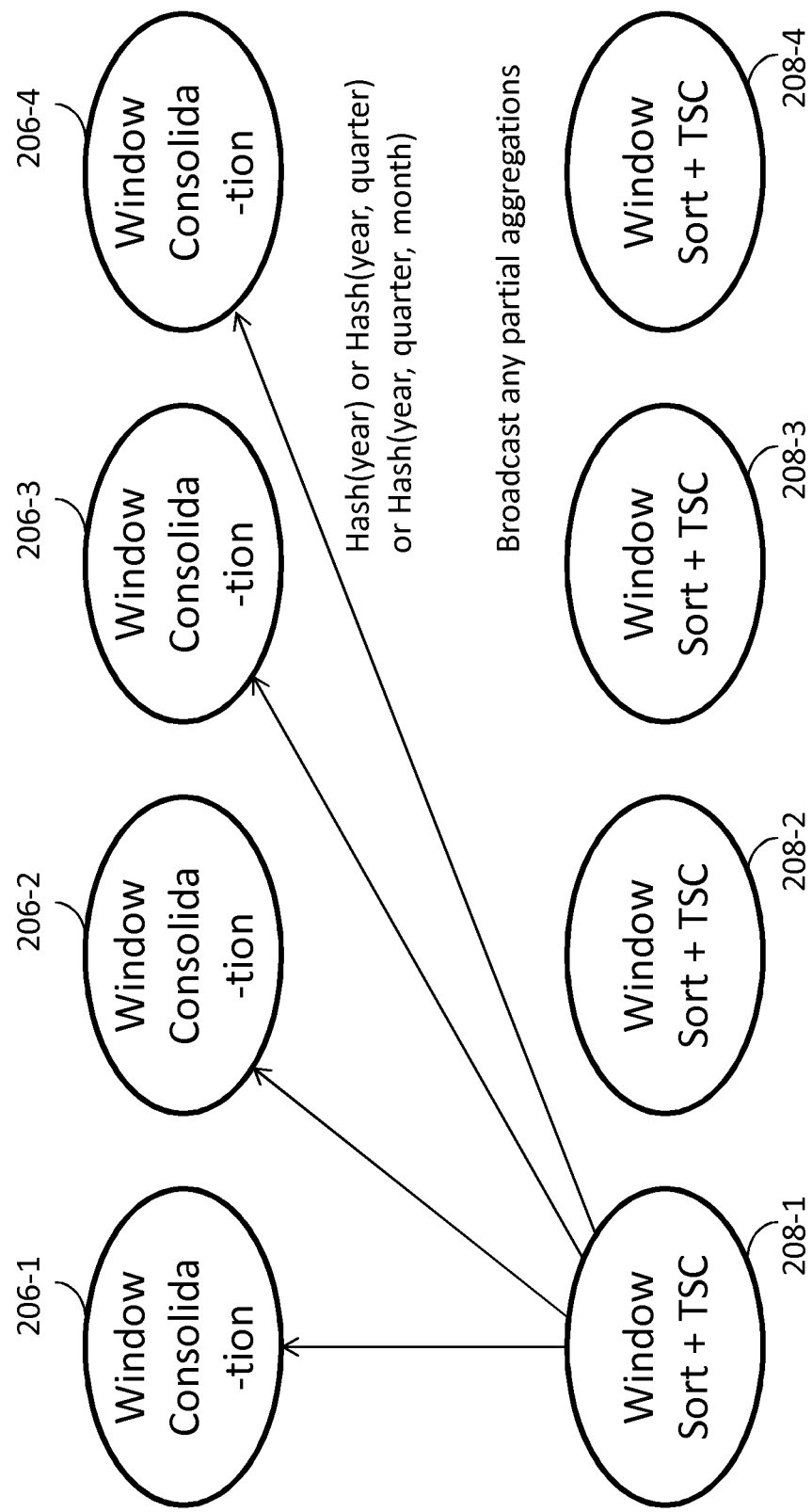
FIG. 2D illustrates adaptively switching execution strategies of a database statement.

FIG. 2D illustrates example adaptive parallel execution in runtime, according to an embodiment. In the runtime, a plurality of parallel executing processes may be used to execute a plurality of producer operators such as window-sort-and-TSC operators 208.

Adaptive parallel execution is based on real-time data analysis of the input source, for example, table scans of the "sales" table in database table 152 as performed in runtime. Thus, the adaptive parallel execution is able to optimize using the actual data records read during runtime rather than relying on outdated static data at the execution plan generation time, as in the estimation approach described above with FIG. 1B.

Query optimizer 126 may generate, before runtime, an execution plan 128 for the database statement in expression (1) based on incorrect estimation of distinct values of partition-by keys of the reporting window functions. At runtime, each of window-sort-and-TSC operators 208-1 through 208-4 monitors (e.g., scans monitor) respective numbers of distinct values of all combinations of partition-by keys (in the present example: year; year and quarter; year, quarter and month), and discovers, from actual data block reading, that one or more combinations of partition-by keys each have sufficient number of distinct values. Such monitoring may be optionally performed on sorted input data in a shared sort order.

Each such window-sort-and-TSC operator notifies a query coordinator that a specific combination of partition-by keys or none of the combinations has a sufficient number of distinct values as well as the smallest number of columns. The query coordinator collects a plurality of these specific combinations from all the window-sort-and-TSC operators and selects a new (global) distribution key among the specific combinations respectively received from the window-sort-and-TSC operators. In some embodiments, the data new distribution key may be a combination that has the largest number of columns among all the specific combinations received from the window-sort-and-TSC operators. In some embodiments, the new data distribution key may be a combination that has been specified by the largest number of the window-sort-and-TSC operators. In some embodiments, if at least one window-sort-and-TSC operators fails to find a specific combination of partition-by keys to have a sufficient number of distinct values, a computation-pushdown execution strategy will be used by all the parallel executing processes evaluating the reporting window functions. In some embodiments, if at least one window-sort-and-TSC operators fails to find a specific combination of partition-by keys to have a sufficient number of distinct values, an extended key execution strategy or a common prefix execution strategy may still be used if a sufficient number (e.g., 60+%, 70+%, 80+%, 90+%, etc.) of window-sort-and-TSC operators support such an execution strategy. The query coordinator notifies all the window-sort-and-TSC processes (208-1 through 208-4 of FIG. 2D) and/or window consolidation operators (206-1 through 206-4 of FIG. 2D) which execution strategy is to be used. If a common prefix execution strategy or an extended key execution strategy is selected, the query coordinator also notifies all the window-sort-and-TSC processes (208-1 through 208-4 of FIG. 2D) and/or window consolidation operators (206-1 through 206-4 of FIG. 2D) of the global combination of partition-by keys. Accordingly, the parallel executing processes collectively and adaptively switch to the selected execution strategy, which may be different from the one in the execution plan generated before runtime.

In an example, if a sufficient number of distinct value for the common prefix (e.g., the "year" column), the following dynamic execution strategy based on the common prefix as a (e.g., new) data distribution key may be used to evaluate the reporting window functions. Under the strategy, window-sort-and-TSC operators (208-1 through 208-4) of FIG. 2D become pass-through nodes and simply redistribute input data based on a distribution function (e.g., hash (year)) to the window consolidation operators (206-1 through 206-4). The window consolidation operators (206-1 through 206-4) compute all three window functions directly.

In another example, if a sufficient number of distinct values is not found for either the "year" column only or a combination of the "year" and "quarter" columns, but if a sufficient number of distinct values is found for a combination of the "year", "quarter" and "month" columns, the following dynamic execution strategy based on the combination of the "year", "quarter" and "month" columns as a (e.g., new) data distribution key may be used to evaluate the reporting window functions. Under this execution strategy, window-sort-and-TSC operators (208-1 through 208-4) first compute, based on their respective subsets of input data, partial evaluation (e.g., sum(sale)) of the reporting window functions (e.g., the "yearly-sales" and "quarterly-sales" reporting window functions) that have partition-by columns fewer than the columns ("year", "quarter" and "month") in the data distribution key. Results of partial evaluations of the reporting window functions (e.g., the "yearly-sales" and "quarterly-sales" reporting window functions) is broadcasted to all the window consolidation operators (206-1 through 206-4). Further, window-sort-and-TSC operators (208-1 through 208-4) of FIG. 2D redistribute their respective subset of input data based on a distribution function (e.g., hash(year, quarter, month)) to the window consolidation operators (206-1 through 206-4). The window consolidation operators (206-1 through 206-4) consolidate partial results from the window sort-and-TSC operators (208-1 through 208-4) for the reporting window functions (e.g., the "yearly-sales" and "quarterly-sales" reporting window functions) which have been evaluated by the window sort-and-TSC operators (208-1 through 208-4). The consolidated results of these reporting window functions (e.g., the "yearly-sales" and "quarterly-sales" reporting window functions) may be kept in a lookup table (e.g., hash table) with distinct values of their respective combinations of partition-by columns (the "year" column only; and the combination of the "year" and "quarterly" columns, respectively). The window consolidation operators (206-1 through 206-4) compute any remaining window functions (e.g., the "monthly-sales" reporting window function) that have not been partially evaluated by the window sort-and-TSC operators (208-1 through 208-4) directly and store the evaluation results of remaining window functions (e.g., the "monthly-sales" reporting window function) with (e.g., expanded columns for "yearly-sales" and "quarterly-sales") input rows. Based on values of partition-by columns (the "year" column only; and the combination of the "year" and "quarterly" columns, respectively) as determined from an input row, consolidated results of the reporting window functions (e.g., the "yearly-sales" and "quarterly-sales" reporting window functions) in the lookup table can be retrieved and added into (e.g., expanded columns for "yearly-sales" and "quarterly-sales") the input row.

It should be noted that one or more aspects of the dynamic execution strategies as discussed above may be implemented in execution plans generated at compile time before runtime in some embodiments. For example, instead of randomly distributing input rows as illustrated in FIG. 2B or FIG. 2C, hash functions as illustrated in FIG. 2D may be used in an extended-data-distribution-key execution plan or a computation-pushdown execution plan generated at compile time before runtime. In addition, instead of performing initial evaluations of all reporting window functions by window sort operators as illustrated in FIG. 2B, (1) partially evaluating only reporting window functions of partition-by columns fewer than columns in a data distribution key by window sort operators and (2) consolidating partial evaluation results from the window sort operators and computing any remaining reporting window functions by window consolidation operators may be used in an extended-data-distribution-key execution plan or a computation-pushdown execution plan generated at compile time before runtime.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for evaluating reporting window functions, the method comprising:
   receiving a database statement that specifies evaluating a set of reporting window functions against a set of rows, wherein each row in the set of rows has values for a plurality of columns;
   wherein each reporting window function in the set of reporting window functions is specified with a respective sequence of partition-by keys in a set of sequences of partition-by keys;
   generating a computation-pushdown execution plan for the database statement, wherein the computation-pushdown execution plan includes a plurality of producer operators and a plurality of consolidation operators,
      wherein each of the plurality of producer operators produces in runtime a respective subset of rows in the set of rows,
      wherein each of the plurality of producer operators computes a respective partial aggregation for each reporting window function in the set of reporting window functions based on the respective subset of rows in the set of rows, and
      wherein each of the plurality of producer operators broadcasts the respective partial aggregation for each reporting window function in the set of reporting window functions to the plurality of consolidation operators;
      wherein each consolidation operator of the plurality of consolidation operators evaluates each reporting window functions in the set of reporting window functions by fully aggregating all partial aggregations broadcasted from the plurality of the producer operators;
   wherein the method is performed by one or more computing devices.

2. The method of claim 1, further comprising:
   in response to receiving the database statement, determining whether there exists a first number of distinct values (NDV) of a data distribution key within a common prefix among the set of sequences of partition-by keys such that the first NDV satisfies one or more criteria associated with a degree of parallelism (DOP);
   in response to determining that there does not exist a first NDV of a data distribution key within the common prefix among the set of sequences of partition-by keys such that the first NDV satisfies the one or more criteria associated with the DOP, determining whether there exists a second NDV of an extended data distribution key among the sets of sequences of partition-by keys such that the second NDV satisfies the one or more criteria associated with the DOP.

3. The method of claim 2, wherein generating a computation-pushdown execution plan for the database statement is in response to determining that there does not exist a second NDV of an extended data distribution key among the sets of sequences of partition-by keys such that the second NDV satisfies the one or more criteria associated with the DOP.

4. The method of claim 1,
   wherein the computation-pushdown execution plan is generated before runtime based at least in part on database statistics relating to NDVs for partition-by keys in the set of sequences of partition-by keys;
   wherein the method further includes:
      the plurality of producer operators monitoring a first NDV of a data distribution key within a common prefix among the set of sequences of partition-by keys to determine in the runtime whether the first NDV satisfies one or more criteria associated with a DOP; and
      in response to determining in the runtime that the first NDV satisfies the one or more criteria associated with the DOP, the plurality of producer operators and a plurality of consumer operators stop executing the computation-pushdown execution plan and adaptively execute a common-prefix execution plan in which the plurality of producer operators neither performs nor broadcasts respective partial aggregations for the set of reporting window functions and in which the plurality of consolidator operators directly performs full aggregations for the set of reporting window functions.

5. The method of claim 1, further including said each of the plurality of producer operators arranging the respective subset of rows in a sort order shared by all reporting window functions in the set of reporting window functions.

6. A method for evaluating reporting window functions, the method comprising:
   receiving a database statement that specifies evaluating a set of reporting window functions against a set of rows, wherein each row in the set of rows has values for a plurality of columns;
   wherein each reporting window function in the set of reporting window functions is specified with a sequence of partition-by keys in a set of sequences of partition-by keys;
   generating an extended-data-distribution-key execution plan for the database statement,
      wherein the extended-data-distribution-key execution plan includes a plurality of producer operators, a plurality of sort operators, and a plurality of consolidator operators,
      wherein each sort operator of the plurality of sort operators is configured to process a respective subset of rows in the set of rows, wherein each row in the respective subset of rows has one of one or more distinct key value combinations of a specific sequence of partition-by keys, and wherein a specific reporting window function is specified with the specific sequence of partition-by keys;
      wherein each sort operator of the plurality of sort operators receives, from the plurality of producer operators, rows that form the respective subset of rows,
      wherein each of the plurality of sort operators computes a respective partial aggregation for at least one reporting window function in the set of reporting window functions based on the respective subset of rows, and wherein each of the plurality of sort operators broadcasts the respective partial aggregation for said at least one reporting window function in the set of reporting window functions to the plurality of consolidator operators, and
      wherein each consolidation operator of the plurality of consolidation operators evaluates said at least one reporting window function in the set of reporting window functions by fully aggregating all partial aggregations broadcasted from the plurality of the sort operators;

wherein the method is performed by one or more computing devices.

7. The method of claim 6, further comprising:

in response to receiving the database statement, determining whether there exists a first number of distinct values (NDV) of a data distribution key within a common prefix among the set of sequences of partition-by keys such that the first NDV satisfies one or more criteria associated with a degree of parallelism (DOP);

in response to determining that there does not exist a first NDV of a data distribution key within the common prefix among the set of sequences of partition-by keys such that the first NDV satisfies the one or more criteria associated with the DOP, determining whether there exists a second NDV of an extended data distribution key among the sets of sequences of partition-by keys such that the second NDV satisfies the one or more criteria associated with the DOP.

8. The method of claim 7, wherein generating an extended-data-distribution-key execution plan for the database statement is in response to determining that there exists a second NDV of an extended data distribution key among the sets of partition-by keys such that the second NDV satisfies the one or more criteria associated with the DOP.

9. The method of claim 6, wherein the extended-data-distribution-key execution plan is generated before runtime based at least in part on database statistics relating to NDVs for partition-by keys in the set of sequences of partition-by keys;

wherein the method further includes:

the plurality of producer operators monitoring a first NDV of a data distribution key within a common prefix among the set of sequences of partition-by keys to determine in the runtime whether the first NDV satisfies one or more criteria associated with a DOP; and in response to determining in the runtime that the first NDV satisfies the one or more criteria associated with the DOP, the plurality of producer operators, the plurality of sort operators and a plurality of consumer operators stopping execution of the extended-data-distribution-key execution plan and adaptively executing a common-prefix execution plan in which the plurality of sort operators neither performs nor broadcasts respective partial aggregations for the set of reporting window functions and in which the plurality of consolidator operators directly performs full aggregations for the set of reporting window functions.

10. The method of claim 6, further including each of the plurality of sort operators arranging the respective subset of rows in a sort order shared by all reporting window functions in the set of reporting window functions.

11. One or more non-transitory computer-readable media storing sequences of instructions which, when executed by one or more processors, cause:

receiving a database statement that specifies evaluating a set of reporting window functions against a set of rows, wherein each row in the set of rows has values for a plurality of columns;

wherein each reporting window function in the set of reporting window functions is specified with a respective sequence of partition-by keys in a set of sequences of partition-by keys;

generating a computation-pushdown execution plan for the database statement, wherein the computation-pushdown execution plan includes a plurality of producer operators and a plurality of consolidation operators, wherein each of the plurality of producer operators produces in runtime a respective subset of rows in the set of rows, wherein each of the plurality of producer operators computes a respective partial aggregation for each reporting window function in the set of reporting window functions based on the respective subset of rows in the set of rows, and wherein each of the plurality of producer operators broadcasts the respective partial aggregation for each reporting window function in the set of reporting window functions to the plurality of consolidation operators;

wherein each consolidation operator of the plurality of consolidation operators evaluates each reporting window functions in the set of reporting window functions by fully aggregating all partial aggregations broadcasted from the plurality of the producer operators.

12. The one or more non-transitory computer-readable media of claim 11, the sequences of instructions further including instructions, that when executed by said one or more processors, cause:

in response to receiving the database statement, determining whether there exists a first number of distinct values (NDV) of a data distribution key within a common prefix among the set of sequences of partition-by keys such that the first NDV satisfies one or more criteria associated with a degree of parallelism (DOP);

in response to determining that there does not exist a first NDV of a data distribution key within the common prefix among the set of sequences of partition-by keys such that the first NDV satisfies the one or more criteria associated with the DOP, determining whether there exists a second NDV of an extended data distribution key among the sets of sequences of partition-by keys such that the second NDV satisfies the one or more criteria associated with the DOP.

13. The one or more non-transitory computer-readable media of claim 12, the sequences of instructions further including instructions, that when executed by said one or more processors, cause generating a computation-pushdown execution plan for the database statement is in response to determining that there does not exist a second NDV of an extended data distribution key among the sets of sequences of partition-by keys such that the second NDV satisfies the one or more criteria associated with the DOP.

14. The one or more non-transitory computer-readable media of claim 11, the sequences of instructions further including instructions, that when executed by said one or more processors, cause:

wherein the computation-pushdown execution plan is generated before runtime based at least in part on database statistics relating to NDVs for partition-by keys in the set of sequences of partition-by keys;

wherein the method further includes:

the plurality of producer operators monitoring a first NDV of a data distribution key within a common prefix among the set of sequences of partition-by keys to determine in the runtime whether the first NDV satisfies one or more criteria associated with a DOP; and in response to determining in the runtime that the first NDV satisfies the one or more criteria associated with the DOP, the plurality of producer operators and a plurality of consumer operators stop executing the computation-pushdown execution plan and adaptively execute a common-prefix execution plan in which the plurality of producer operators neither performs nor broadcasts respective partial aggregations for the set of reporting window functions and in which the plurality of consolidator operators directly performs full aggregations for the set of reporting window functions.

15. The one or more non-transitory computer-readable media of claim 11, the sequences of instructions further including instructions, that when executed by said one or more processors, cause said each of the plurality of producer operators arranging the respective subset of rows in a sort order shared by all reporting window functions in the set of reporting window functions.

16. One or more non-transitory computer-readable media storing sequences of instructions which, when executed by one or more processors, cause performance of:
receiving a database statement that specifies evaluating a set of reporting window functions against a set of rows, wherein each row in the set of rows has values for a plurality of columns;
wherein each reporting window function in the set of reporting window functions is specified with a sequence of partition-by keys in a set of sequences of partition-by keys;
generating an extended-data-distribution-key execution plan for the database statement, wherein the extended-data-distribution-key execution plan includes a plurality of producer operators, a plurality of sort operators, and a plurality of consolidator operators,
wherein each sort operator of the plurality of sort operators is configured to process a respective subset of rows in the set of rows, wherein each row in the respective subset of rows has one of one or more distinct key value combinations of a specific sequence of partition-by keys, and wherein a specific reporting window function is specified with the specific sequence of partition-by keys;
wherein each sort operator of the plurality of sort operators receives, from the plurality of producer operators, rows that form the respective subset of rows,
wherein each of the plurality of sort operators computes a respective partial aggregation for at least one reporting window function in the set of reporting window functions based on the respective subset of rows, and wherein each of the plurality of sort operators broadcasts the respective partial aggregation for said at least one reporting window function in the set of reporting window functions to the plurality of consolidator operators, and
wherein each consolidation operator of the plurality of consolidation operators evaluates said at least one reporting window function in the set of reporting window functions by fully aggregating all partial aggregations broadcasted from the plurality of the sort operators.

17. The one or more non-transitory computer-readable media of claim 16, the sequences of instructions further including instructions, that when executed by said one or more processors, cause:
in response to receiving the database statement, determining whether there exists a first number of distinct values (NDV) of a data distribution key within a common prefix among the set of sequences of partition-by keys such that the first NDV satisfies one or more criteria associated with a degree of parallelism (DOP);
in response to determining that there does not exist a first NDV of a data distribution key within the common prefix among the set of sequences of partition-by keys such that the first NDV satisfies the one or more criteria associated with the DOP, determining whether there exists a second NDV of an extended data distribution key among the sets of sequences of partition-by keys such that the second NDV satisfies the one or more criteria associated with the DOP.

18. The one or more non-transitory computer-readable media of claim 17, the sequences of instructions further including instructions, that when executed by said one or more processors, cause generating an extended-data-distribution-key execution plan for the database statement is in response to determining that there exists a second NDV of an extended data distribution key among the sets of partition-by keys such that the second NDV satisfies the one or more criteria associated with the DOP.

19. The one or more non-transitory computer-readable media of claim 16,
wherein the extended-data-distribution-key execution plan is generated before runtime based at least in part on database statistics relating to NDVs for partition-by keys in the set of sequences of partition-by keys;
wherein the sequences of instructions further including instructions, that when executed by said one or more processors, cause:
the plurality of producer operators monitoring a first NDV of a data distribution key within a common prefix among the set of sequences of partition-by keys to determine in the runtime whether the first NDV satisfies one or more criteria associated with a DOP; and
in response to determining in the runtime that the first NDV satisfies the one or more criteria associated with the DOP, the plurality of producer operators, the plurality of sort operators and a plurality of consumer operators stopping execution of the extended-data-distribution-key execution plan and adaptively executing a common-prefix execution plan in which the plurality of sort operators neither performs nor broadcasts respective partial aggregations for the set of reporting window functions and in which the plurality of consolidator operators directly performs full aggregations for the set of reporting window functions.

20. The one or more non-transitory computer-readable media of claim 16, the sequences of instructions further including instructions, that when executed by said one or more processors, cause for each of the plurality of sort operators arranging the respective subset of rows in a sort order shared by all reporting window functions in the set of reporting window functions.

* * * * *